United States Patent
Yang et al.

(10) Patent No.: US 11,068,704 B2
(45) Date of Patent: *Jul. 20, 2021

(54) HEAD POSE AND DISTRACTION ESTIMATION

(71) Applicant: Futurewei Technologies, Inc., Plano, TX (US)

(72) Inventors: Lei Yang, Fremont, CA (US); Fatih Porikli, San Jose, CA (US); Hai Yu, Shanghai (CN)

(73) Assignee: Futurewei Technologies, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/704,586

(22) Filed: Dec. 5, 2019

(65) Prior Publication Data

US 2020/0257895 A1 Aug. 13, 2020

Related U.S. Application Data

(63) Continuation of application No. 15/865,732, filed on Jan. 9, 2018, now Pat. No. 10,528,802.

(51) Int. Cl.
*G06K 9/00* (2006.01)
*G06F 3/01* (2006.01)
*G06F 3/03* (2006.01)

(52) U.S. Cl.
CPC ......... *G06K 9/00335* (2013.01); *G06F 3/012* (2013.01); *G06F 3/013* (2013.01); *G06F 3/0304* (2013.01); *G06K 9/00255* (2013.01)

(58) Field of Classification Search
None
See application file for complete search history.

(56) References Cited

U.S. PATENT DOCUMENTS

| 7,970,175 | B2 | 6/2011 | Malawey et al. |
| 8,687,880 | B2 * | 4/2014 | Wei ................ G06K 9/00281 382/159 |

(Continued)

FOREIGN PATENT DOCUMENTS

| CN | 103793680 A | 5/2014 |
| CN | 106598221 A | 4/2017 |

(Continued)

OTHER PUBLICATIONS

"U.S. Appl. No. 15/865,732, Notice of Allowance dated Sep. 5, 2019", 10 pgs.

(Continued)

*Primary Examiner* — Fayyaz Alam
(74) *Attorney, Agent, or Firm* — Schwegman Lundberg & Woessner, P.A.

(57) ABSTRACT

A computer-implemented method for estimating head pose angles of a user includes determining a first rotation between a first head pose axis associated with a first image of a plurality of images of the user and a camera axis associated with a camera taking the images. A second rotation is determined between a second head pose axis associated with a second image of the user and the camera axis. The first and second head pose axes are determined based on light reflections within the plurality of images. A head pose angle of the user can be estimated based on the first rotation and the second rotation. An alert can be generated based on the estimated head pose angle.

22 Claims, 17 Drawing Sheets

(56) References Cited

U.S. PATENT DOCUMENTS

| | | | |
|---|---|---|---|
| 8,885,882 B1 | 11/2014 | Yin et al. | |
| 9,672,412 B2 | 6/2017 | Ngan et al. | |
| 2008/0060497 A1* | 3/2008 | Lambert | G01B 7/003 84/307 |
| 2010/0033333 A1* | 2/2010 | Victor | A61B 5/1114 340/576 |
| 2014/0204193 A1 | 7/2014 | Zhang et al. | |
| 2016/0063303 A1 | 3/2016 | Cheung et al. | |
| 2016/0070966 A1 | 3/2016 | Yang et al. | |
| 2017/0119298 A1 | 5/2017 | Cheung | |
| 2018/0005395 A1 | 1/2018 | D'angelo et al. | |
| 2019/0156100 A1* | 5/2019 | Rougeaux | A61B 3/113 |
| 2019/0212813 A1* | 7/2019 | Yang | G06F 3/0304 |
| 2019/0213402 A1 | 7/2019 | Yang et al. | |

FOREIGN PATENT DOCUMENTS

| | | |
|---|---|---|
| CN | 106796449 A | 5/2017 |
| KR | 20150109987 A | 10/2015 |
| KR | 101702878 B1 | 2/2017 |
| WO | WO-2018000020 A1 | 1/2018 |
| WO | WO-2018006019 A1 | 1/2018 |

OTHER PUBLICATIONS

"International Application No. PCT/CN2018/123827, International Search Report and Written Opinion dated Apr. 1, 2019", (dated Apr. 1, 2019), 8 pgs.

Borghi, Guido, et al., "POSEidon: Face-from-Depth for Driver Pose Estimation", IEEE International Conference on Computer Vision and Pattern Recognition, 2017, (Mar. 2017), 1-10.

Guestrin, Elias Daniel, "General Theory of Remote Gaze Estimation Using the Pupil Center and Corneal Reflections", IEEE Transactions on Biomedical Engineering, 53(6), (Jun. 2006), 1124-1133.

Horprasert, Thanarat, et al., "Computing 3-D Head Orientation from a Monocular Image Sequence", IEEE International Conference on Automatic Face and Gesture Recognition, 1996, (1996), 242-247.

Jourabloo, Amin, et al., "Pose-Invariant 3D Face Alignment", 2015 IEEE International Conference on Computer Vision, (2015), 3694-3702.

Murphy-Chutorian, Erik, et al., "Head Pose Estimation in Computer Vision: A Survey", IEEE Transactions on Pattern Analysis and Machine Intelligence, 31(4), (Apr. 2009), 607-626.

Setthawong, Pisal, et al., "Head Pose Estimation on Eyeglasses Using Line Detection and Classification Approach", International Conference on Advances in Information Technology, (2010), 126-136.

"European Application No. 18899348.9, Supplementary European Search Report dated Dec. 18, 2020", (dated Dec. 18, 2020), 14 pgs.

\* cited by examiner

HEAD POSE AND DISTRACTION ESTIMATION

RELATED APPLICATION

This application is a continuation of and claims the benefit of priority to U.S. application Ser. No. 15/865,732, filed 9 Jan. 2018, which application is incorporated by reference as if reproduced herein and made a part hereof in its entirety, and the benefit of priority of which is claimed herein.

TECHNICAL FIELD

The present disclosure is related to estimating human focus of attention and, in particular embodiments, to head pose and distraction estimation.

BACKGROUND

With the popularization of handheld smart devices, distracted driving is one of the fastest-growing safety issues on the road. For example, according to the National Safety Council, a minimum of 27% of crashes involved cell phone-related driver distraction, including dialing, texting, and reaching. In the United States, automobile accidents are the fourth-leading cause of death. These distracted-driving accidents cause substantial loss of lives as well as economic harm.

Human head pose has been widely recognized as an important visual cue in estimating human focus of attention. In particular, in an automotive context, head pose estimation is one of the key elements for attention monitoring and driver behavior analysis, with applicability in distracted driving systems.

SUMMARY

Various examples are now described to introduce a selection of concepts in a simplified form that are further described below in the Detailed Description. The Summary is not intended to identify key or essential features of the claimed subject matter, nor is it intended to be used to limit the scope of the claimed subject matter.

According to one aspect of the present disclosure, there is provided a computer-implemented method for estimating head pose angles of a user. The method can include determining, by one or more processors, a first rotation between a first head pose axis associated with a first image of a plurality of images of the user and a camera axis associated with a camera taking the images. The one or more processors can determine a second rotation between a second head pose axis associated with a second image of the plurality of images of the user and the camera axis. The first and second head pose axes are determined based on light reflections within the plurality of images. The one or more processors can estimate a head pose angle of the user based on the first rotation and the second rotation. An alert can be generated by the one or more processors, based on the estimated head pose angle.

Optionally, in any of the preceding embodiments, the light reflections include corneal reflections from a plurality of light sources. The one or more processors can further detect the corneal reflections based on at least one image of the user's eyes. The one or more processors can determine three-dimensional (3D) coordinates of centers of corneal curvatures of the user's eyes based on the corneal reflections, the first and second head pose axes centered based on the determined 3D coordinates.

Optionally, in any of the preceding embodiments, the one or more processors can be configured to retrieve facial landmark parameters of the user, the facial landmark parameters indicative of 3D coordinates of a plurality of facial landmarks of the user in relation to an initial head pose axis.

Optionally, in any of the preceding embodiments, the one or more processors can be configured to detect the plurality of facial landmarks within the first image and the second image based on the facial landmark parameters.

Optionally, in any of the preceding embodiments, the one or more processors can be configured to determine the first rotation and the second rotation based on the detected plurality of facial landmarks.

Optionally, in any of the preceding embodiments, the one or more processors can be configured to determine sources of the corneal reflections, where the sources include a left eye of the user or a right eye of the user.

Optionally, in any of the preceding embodiments, the 3D coordinates of the plurality of facial landmarks are in relation to the center of corneal curvature of the left eye, the center of corneal curvature of the right eye, or a midpoint between the centers of corneal curvatures of both eyes.

Optionally, in any of the preceding embodiments, the plurality of facial landmarks include one or both of the user's eyes and the user's mouth.

Optionally, in any of the preceding embodiments, the first image is a front pose image of the user, and the second image is an image that is acquired subsequently to the first image.

Optionally, in any of the preceding embodiments, the one or more processors can be configured to determine a first set of two-dimensional (2D) coordinates of the plurality of facial landmarks of the user based on the first image.

Optionally, in any of the preceding embodiments, the one or more processors can be configured to determine a second set of 2D coordinates of the plurality of facial landmarks of the user based on the 3D coordinates within the retrieved facial landmark parameters.

Optionally, in any of the preceding embodiments, the one or more processors can be configured to determine a plurality of rotation angles representing the first rotation based on facial landmark correspondences between the first set of 2D coordinates and the second set of 2D coordinates.

Optionally, in any of the preceding embodiments, the one or more processors can be configured to determine the second set of 2D coordinates further based on an intrinsic matrix of the camera.

Optionally, in any of the preceding embodiments, the first image includes a first set of images taken by the camera, and the one or more processors can be configured to determine the first rotation based on an average of rotation angles associated with the first set of images.

Optionally, in any of the preceding embodiments, the one or more processors can be configured to detect the user's face and a pattern superimposed on the user's face using at least the first image of the plurality of images.

Optionally, in any of the preceding embodiments, the one or more processors can be configured to determine initial two-dimensional (2D) coordinates of a set of corner points within the pattern.

Optionally, in any of the preceding embodiments, the one or more processors can be configured to determine subsequent 2D coordinates of the set of corner points using at least the second image of the plurality of images.

Optionally, in any of the preceding embodiments, the one or more processors can be configured to determine a fundamental matrix based on the initial and subsequent 2D coordinates of the set of corner points. The fundamental matrix relates the subsequent 2D coordinates to the initial 2D coordinates of the set of corner points.

Optionally, in any of the preceding embodiments, the one or more processors can be configured to determine an essential matrix based on the fundamental matrix and an intrinsic matrix of the camera.

Optionally, in any of the preceding embodiments, the essential matrix includes a rotational component and a translational component indicative of the user's movement between the first and second images.

Optionally, in any of the preceding embodiments, the one or more processors can be configured to estimate the head pose angle of the user based on the rotational component of the essential matrix.

Optionally, in any of the preceding embodiments, the pattern is a predefined pattern.

Optionally, in any of the preceding embodiments, the one or more processors can be configured to retrieve a plurality of random head pose images of the user.

Optionally, in any of the preceding embodiments, the one or more processors can be configured to extract corner points of the predefined pattern using the plurality of random head pose images.

Optionally, in any of the preceding embodiments, the one or more processors can be configured to generate the intrinsic matrix based on the extracted corner points of the predefined pattern.

Optionally, in any of the preceding embodiments, the one or more processors can be configured to detect the pattern on a mask worn by the user.

Optionally, in any of the preceding embodiments, the pattern is one of a random pattern or a checkerboard pattern.

According to one aspect of the present disclosure, there is provided a system for estimating head pose angles of a user. The system includes a memory storage comprising instructions, and one or more processors in communication with the memory. The one or more processors execute the instructions to perform determining a first rotation between a first head pose axis associated with a first image of a plurality of images of the user and a camera axis associated with a camera taking the images. The one or more processors execute the instructions to perform determining a second rotation between a second head pose axis associated with a second image of the plurality of images of the user and the camera axis. The first and second head pose axes are determined based on light reflections within the plurality of images. The one or more processors execute the instructions to perform estimating a head pose angle of the user based on the first rotation and the second rotation. The one or more processors execute the instructions to perform, based on the estimated head pose angle, generating an alert.

Optionally, in any of the preceding embodiments, the light reflections include corneal reflections from a plurality of light sources.

Optionally, in any of the preceding embodiments, the one or more processors execute the instructions to further perform detecting the corneal reflections based on at least one image of the user's eyes.

Optionally, in any of the preceding embodiments, the one or more processors execute the instructions to further perform determining three-dimensional (3D) coordinates of centers of corneal curvatures of the user's eyes based on the corneal reflections, the first and second head pose axes centered based on the determined 3D coordinates.

Optionally, in any of the preceding embodiments, the one or more processors execute the instructions to further perform retrieving facial landmark parameters of the user, the facial landmark parameters indicative of 3D coordinates of a plurality of facial landmarks of the user in relation to an initial head pose axis.

Optionally, in any of the preceding embodiments, the one or more processors execute the instructions to further perform detecting the plurality of facial landmarks within the first image and the second image based on the facial landmark parameters.

Optionally, in any of the preceding embodiments, the one or more processors execute the instructions to further perform determining the first rotation and the second rotation based on the detected plurality of facial landmarks.

According to one aspect of the present disclosure, there is provided a non-transitory computer-readable medium storing computer instructions for estimating head pose angles of a user. When executed by one or more processors, the instructions cause the one or more processors to perform determining a first rotation between a first head pose axis associated with a first image of a plurality of images of the user and a camera axis associated with a camera taking the images. The instructions further cause the one or more processors to perform determining a second rotation between a second head pose axis associated with a second image of the plurality of images of the user and the camera axis. The first and second head pose axes are determined based on light reflections within the plurality of images. The instructions further cause the one or more processors to perform estimating a head pose angle of the user based on the first rotation and the second rotation. The instructions further cause the one or more processors to perform, based on the estimated head pose angle, generating an alert.

Any one of the foregoing examples may be combined with any one or more of the other foregoing examples to create a new embodiment within the scope of the present disclosure.

DETAILED DESCRIPTION

Figure 1:
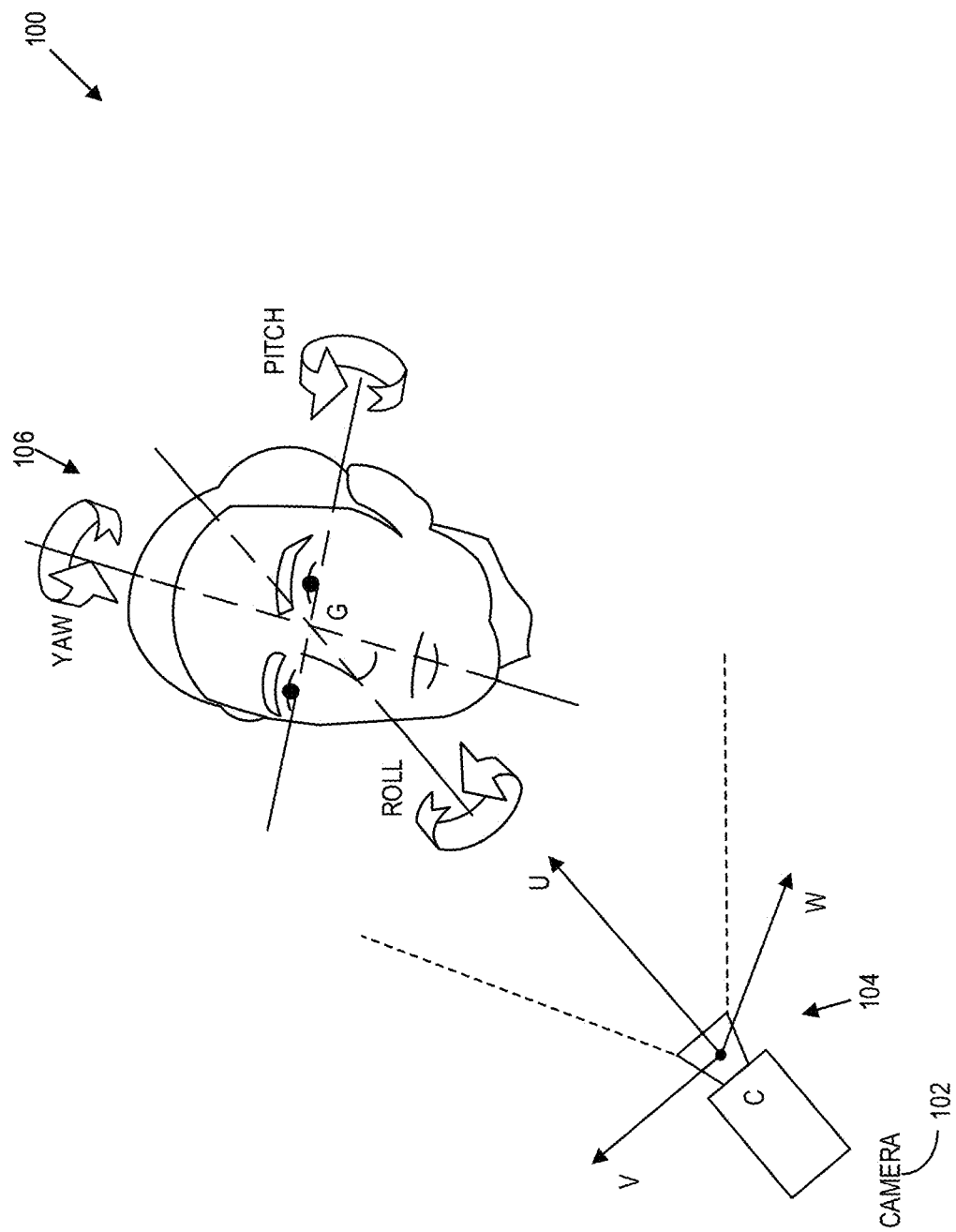
FIG. 1 is an illustration of example head pose estimation parameters, according to some example embodiments.

In the following description, reference is made to the accompanying drawings that form a part hereof, and in which are shown, by way of illustration, specific embodiments which may be practiced. These embodiments are described in sufficient detail to enable those skilled in the art to practice the inventive subject matter, and it is to be understood that other embodiments may be utilized and that structural, logical, and electrical changes may be made without departing from the scope of the present disclosure. The following description of example embodiments is, therefore, not to be taken in a limiting sense, and the scope of the present disclosure is defined by the appended claims.

The functions or algorithms described herein may be implemented in software, in one embodiment. The software may consist of computer-executable instructions stored on computer-readable media or a computer-readable storage device such as one or more non-transitory memories or other types of hardware-based storage devices, either local or networked. The software may be executed on a digital signal processor, application-specific integrated circuit (ASIC), programmable data plane chip, field-programmable gate array (FPGA), microprocessor, or other type of processor operating on a computer system, turning such a computer system into a specifically programmed machine. The computer system may be integrated into a vehicle.

Techniques described herein can be used for head pose angle estimation, which has applicability in driver monitoring and distracted driving warning systems. In accordance with techniques described herein, a camera can be used to monitor a user (e.g., a vehicle driver) and take periodic images of the user. A plurality of light sources can be used in addition to the camera to generate corneal reflections, which can be detected within the user's eyes in images taken by the camera. A midpoint between the centers of the corneal curvatures calculated based on the corneal reflections on the left eye and the right eye can be used as the center for a new coordinate system axis for determining translational and rotational components of different head poses of the user. Alternatively, the new coordinate system axis can be centered at the center of corneal curvature of the left eye or the right eye of the user.

In some aspects, translational components (e.g., three-dimensional (3D) coordinates of key facial landmarks in relation to the new coordinate system axis) can be determined based on an initial image of the user, which can be taken during a camera calibration process. For subsequent images of the user, the translational components and the rotational components (e.g., head pose angles which are a measure of rotational movement of the user's head) can be determined based on the translational components associated with the initial image. At any given moment, current head pose angles of the user can be determined based on rotational components associated with sequential images acquired by the camera. By estimating the three translation parameters of head movement (i.e., three 3D coordinates indicating translational movement of the user in relation to the new coordinate axis), the degrees of freedom (DOF) for head pose estimation are simplified from six to three (i.e., three head pose rotation angles that constitute the rotational component can be estimated), leading to a significant increase in the accuracy of 3D head pose estimation.

In some aspects, other techniques can be used for head pose angle estimation as well. For example, a user can wear a mask, which can include a random pattern or a fixed/predefined pattern appearing on the user's forehead. The three head pose angles that constitute the rotational component can be computed by solving an essential matrix, which relates the corresponding key corner points on the mask in the current image and a registered front head pose image of the user wearing the mask.

The disclosed mechanisms can avoid the complexity of motion-sensor implementations for head pose estimation without requiring specially designed hardware in order to utilize the sensor detection data. Accuracy or failure in detecting head pose can be improved over various image-based solutions using 2D images to reconstruct 3D head information and compare to a template to determine angles, or using detection of eyeglasses or elements of eyeglasses to determine angles. The disclosed mechanisms do not depend on, or require, depth images, a significant data set for neural network training, nor a common head pose axis, which is the axis running through the 3D centre of a human's head, which point is difficult to estimate and measure.

By using the new head pose axis discussed in various techniques herein (i.e., the axis centered based on the corneal reflections), the use of the conventional common head pose axis (which is difficult to estimate as it is centered in the middle of the human head) is avoided and head pose angle estimation is improved. Additionally, pure image-based solutions in the prior art need to perform calculations on six DOF (i.e., three translational and three rotational components are estimated). In the current techniques discussed herein below, the translational components can be fixed, and accuracy of the head pose estimation is increased since only the three rotational components are estimated, based on the new head pose axis centered using the corneal reflections. As used herein, the term "corneal reflection" refers to light reflected by the corneal surface of a human's eye, where the light reflection appears on the eye's corneal surface (i.e., the corneal surface is acting as a mirror, reflecting the light, and making the reflection visible in, for example, a camera taking frontal images of the user's eyes/face).

FIG. 1 is an illustration 100 of example head pose estimation parameters, according to some example embodiments. As used herein, the term "head pose estimation" refers to the process of inferring the orientation of a person's head relative to the view of a camera (i.e., relative to a camera coordinate system centered at the camera). Referring to FIG. 1, there is illustrated a camera 102 viewing a user's head 106. A camera coordinate system (CCS) 104 is centered at point C of the camera 102. With respect to the CCS 104, the user's head 106 can be described as a rigid object which is free to move in space with six DOF: three translational components and three rotational components. The three translational components can be expressed with 3D coordinates of the user's head 106 in relation to the CCS 104. The three rotational components can be expressed with the user's head pose angles—yaw, pitch, and roll. As seen in FIG. 1, the head pose angles are in relation to common head pose axes which are centered at the virtual center of the user's head 106, indicated as point G. As seen in FIG. 1, three head pose axes are illustrated (one for each of the three rotational angles associated with yaw, pitch, and roll), each originating at point G. In some aspects, head pose angles can be estimated in relation to head pose axes that are determined based on centers of corneal curvatures of the user's eyes. The centers of corneal curvatures of the user's eyes can be determined by detecting corneal reflections of light sources that are separate from the camera 102.

Figure 2A:
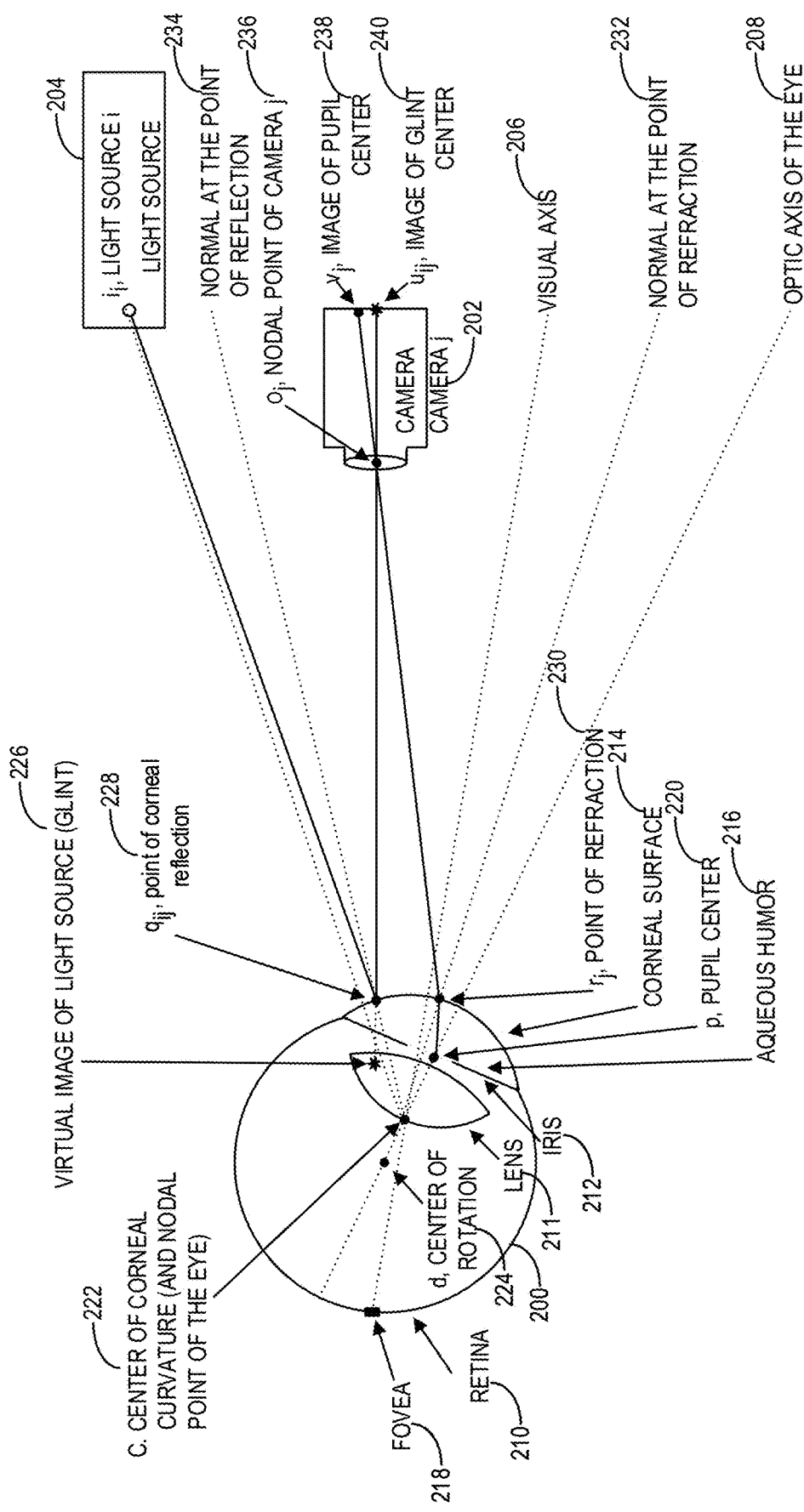
FIG. 2A is an illustration of some key elements in geometry gaze estimation, which can be used in connection with some example embodiments.

FIG. 2A is an illustration of some key elements in geometry gaze estimation, which can be used in connection with some example embodiments. Referring to FIG. 2A, there is illustrated a user's eye 200 being viewed by a camera 202. A light source 204 can be used in addition to the camera 202 to project light into the user's eye 200 so that corneal reflections of the projected light can be detected in one or more images taken by the camera 202. The center of the camera 202 is the camera's nodal point 236.

As seen in FIG. 2A, the user's eye 200 can include the following anatomical parts: a fovea 218, a retina 210, a lens 211, an iris 212, aqueous humor 216, a pupil center 220, a center of corneal curvature 222, and a corneal surface 214.

When the light source 204 emits light into the user's eye 200, a corneal reflection 228 of the light source can be visible on the corneal surface 214. The normal at the point of reflection is indicated as 234, and the normal at a point of refraction 230 is indicated as 232. The virtual image of the light source (glint) 226 has a corresponding image 240 within the camera 202, and the pupil center 220 has a corresponding image 238 within the camera 202. A visual axis 206 of the user's eye 200 connects the fovea 218 and the center of corneal curvature 222. An optic axis 208 connects a center of rotation 224 with the center of corneal curvature 222.

Figure 2B:
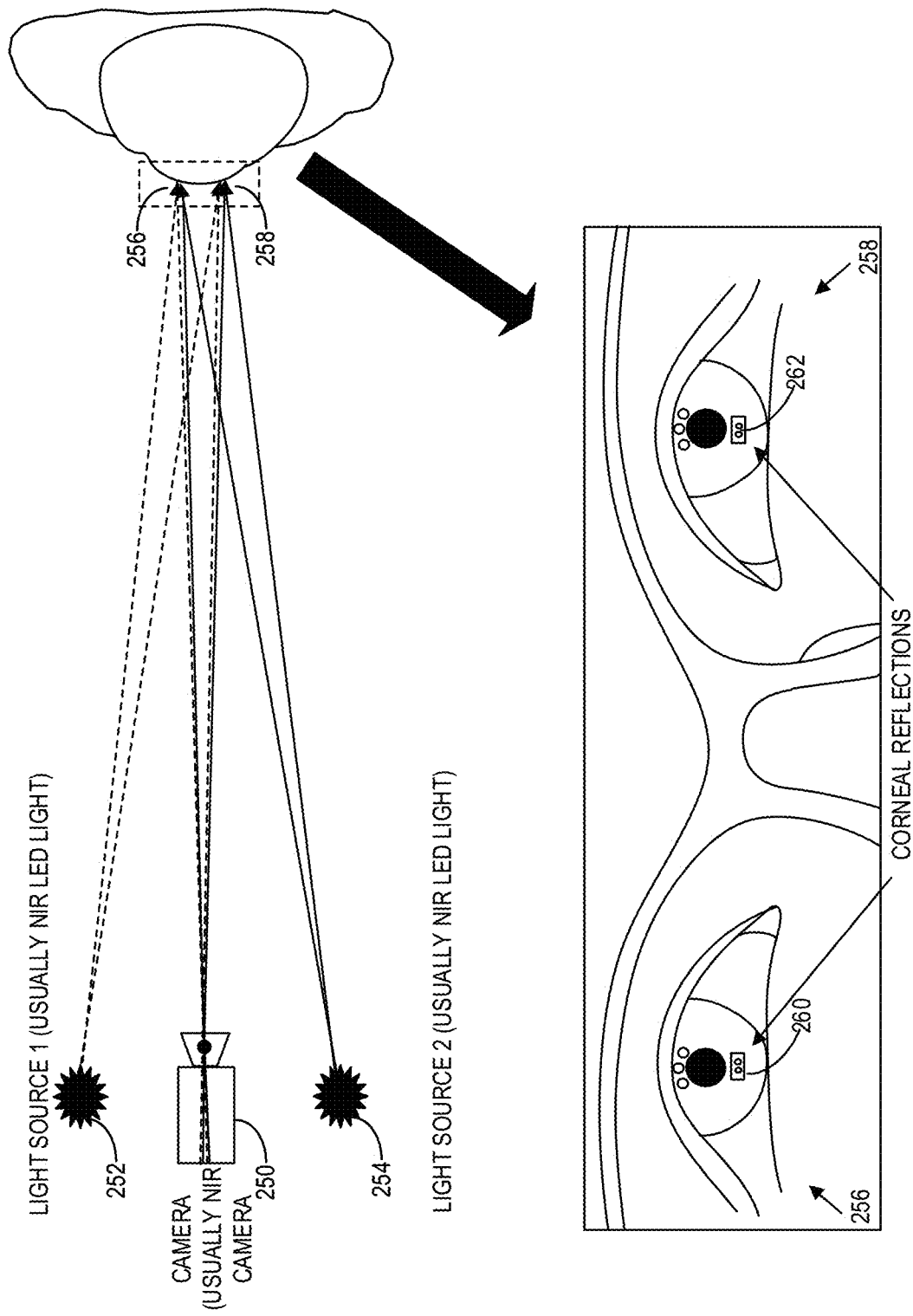
FIG. 2B is an illustration of a corneal reflection—based head pose estimation system with corneal reflection samples, according to some example embodiments.

FIG. 2B is an illustration of a corneal reflection—based head pose estimation system with corneal reflection samples, according to some example embodiments. In some aspects, head pose angle estimation can be performed using corneal reflections. Referring to FIG. 2B, a camera 250 can be used in connection with two separate light sources 252 and 254. In some aspects, the camera 250 can be a near infrared (NIR) camera. The light sources 252 and 254 can be LED or other types of light sources, including NIR LED light sources.

In some aspects, when the light sources 252 and 254 are activated, corneal reflections 260 and 262 of the two light sources can be seen in eyes 256 and 258 respectively. Based on biomedical knowledge about the human eyeball (e.g., as seen in FIG. 2A) as well as the geometric relationships between the positions of the corneal reflections of the two light sources in the camera, and the camera intrinsic parameters (e.g., the camera's intrinsic matrix I which can be determined during camera calibration), the detection of the corneal reflections 260 and 262 in the user's eyes is a theoretically sufficient condition to estimate the 3D coordinates of the center of corneal curvatures of the eyes in the camera coordinate system (CCS). In some aspects, the 3D coordinates of the center of corneal curvatures of the eyes can be used for human head pose estimation.

Figure 3:
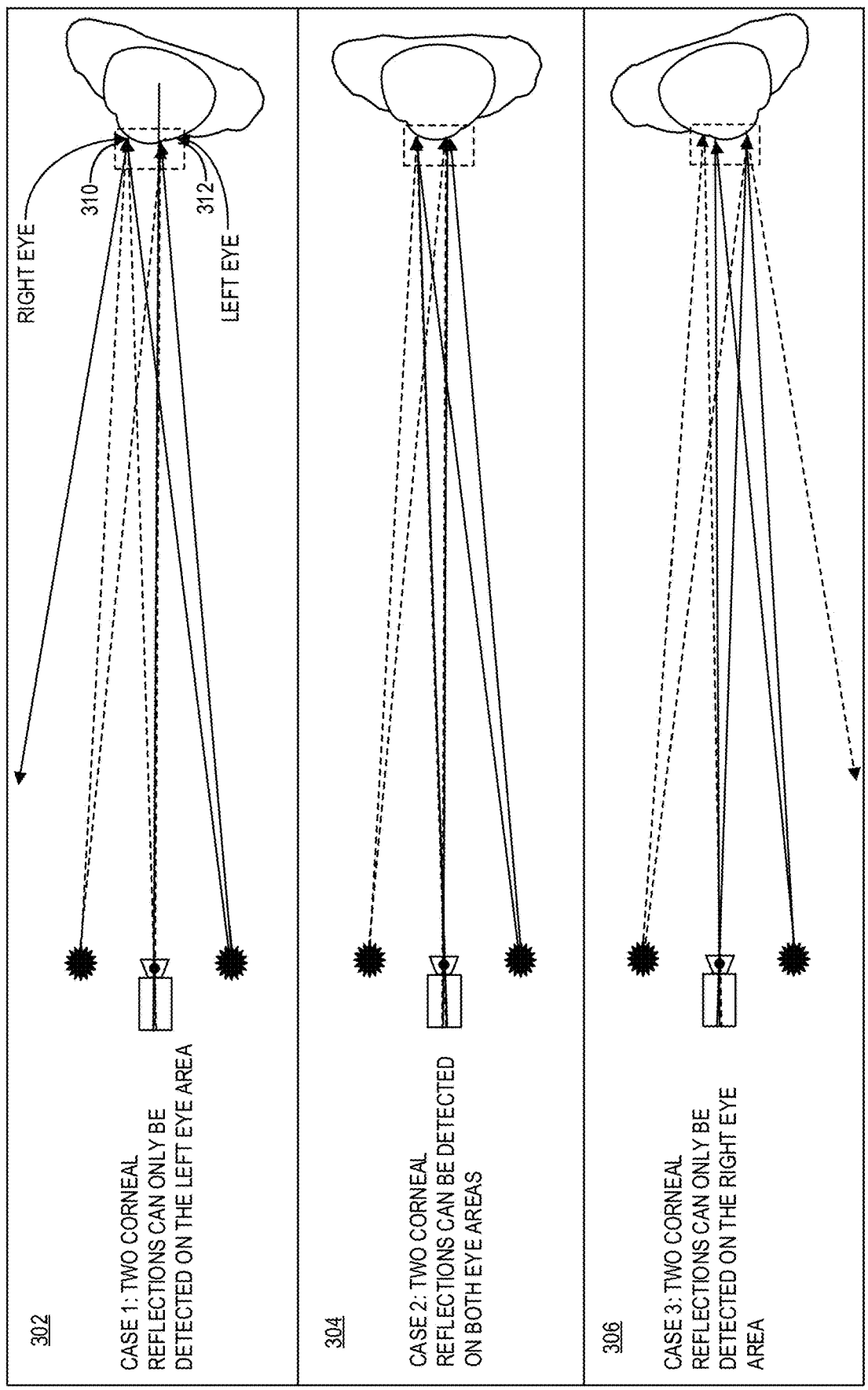
FIG. 3 illustrates example pose relationships between a subject's head and the camera in a head pose estimation system, according to some example embodiments.

FIG. 3 illustrates example pose relationships between a subject's head and the camera in a head pose estimation system, according to some example embodiments. Referring to FIG. 3, there are three different use cases 302, 304, and 306 which can be used during head pose estimation. More specifically, use cases 302, 304, and 306 describe pose relationships between the user's head and the camera, based on the corneal reflections detected in the user's right eye 310 and left eye 312.

For example, in connection with use case 302, the user's head is turned to the right so that two corneal reflections can be detected only in the left eye 312. In connection with use case 304, two corneal reflections can be detected in both eyes 310 and 312. In connection with use case 306, the user's head is turned to the left so that two corneal reflections can be detected only in the right eye 310. In some aspects, as explained herein below, predefined facial landmark models as well as coordinate systems can be dynamically switched to match one of the three use cases illustrated in FIG. 3 for accurate head pose estimation.

Figure 4A:
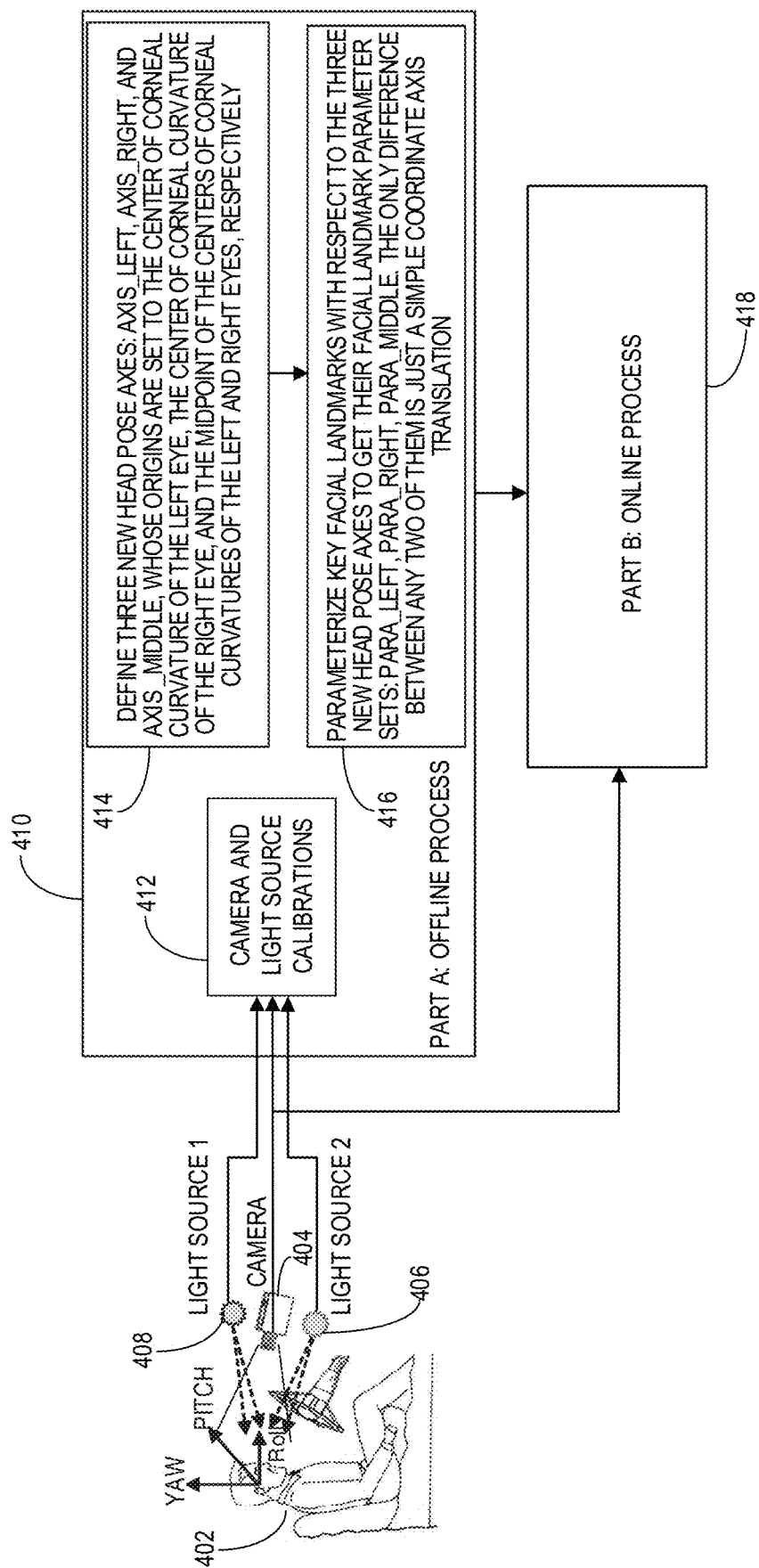
FIG. 4A and FIG. 4B are flowchart illustrations of a method of head pose estimation, according to some example embodiments.
Figure 4B:
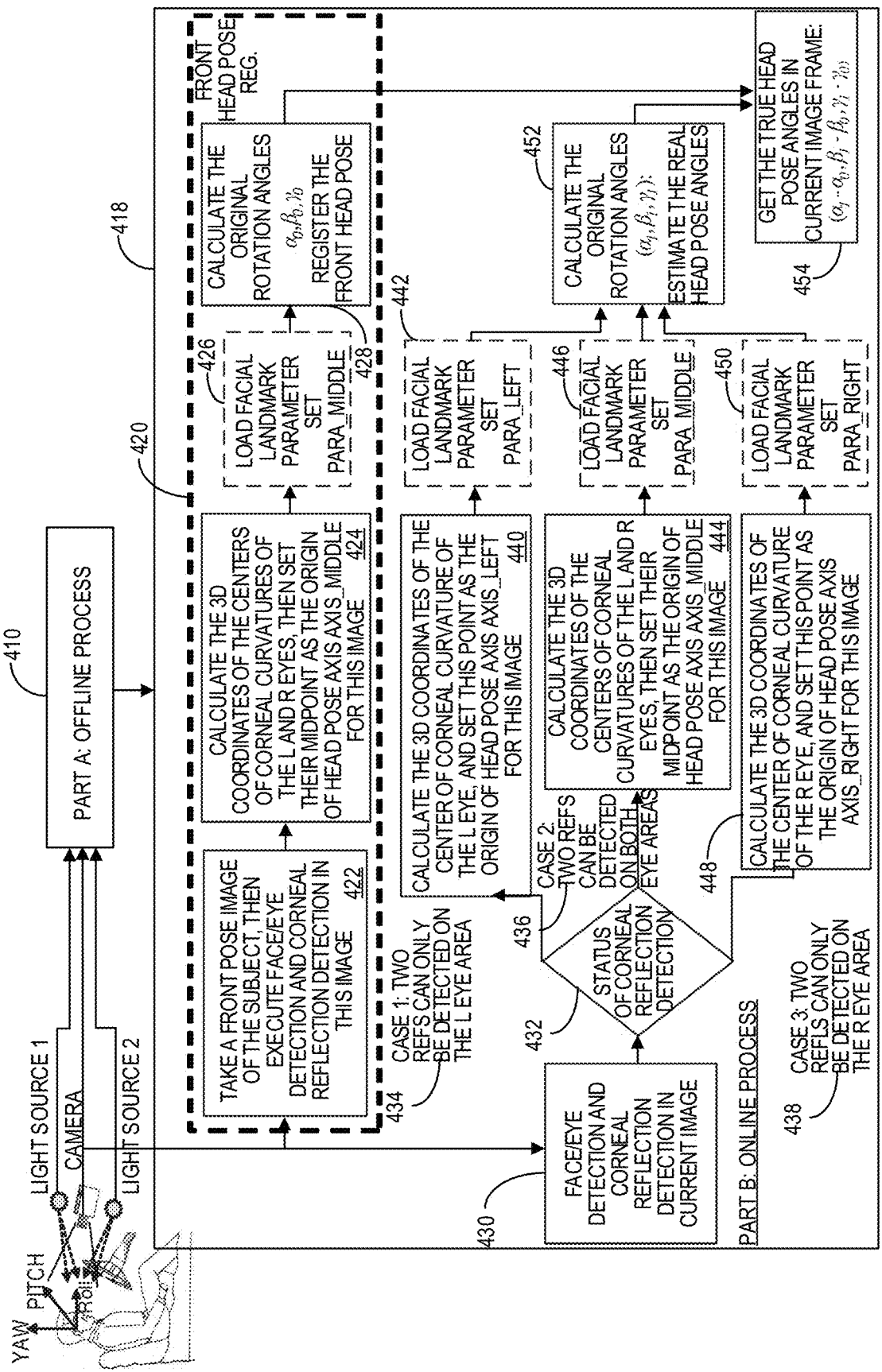

FIG. 4A and FIG. 4B are flowchart illustrations of a method of head pose estimation, according to some example embodiments. In some aspects, head pose estimation can be performed in two stages, namely, an off-line process and an online process, as illustrated in FIG. 4A and FIG. 4B.

Referring to FIG. 4A, there is illustrated an example off-line process 410, which can be used in connection with head pose estimation. An example head pose estimation system can include a camera 404 disposed opposite a user 402 (e.g., a vehicle driver), with two separate light sources 406 and 408 located proximate to the camera 404.

During the example off-line process 410, camera and light-source calibration 412 can be performed. During the calibration 412, the origin of the CCS can be established as the nodal point of the camera (e.g., the camera's nodal point 236). The calibration 412 can further include calibrating the camera 404 (e.g., to obtain the camera intrinsic matrix I) as well as calibrating the light sources 406 and 408 (e.g., to obtain the positions of the light sources 406 and 408 with respect to the CCS). In some aspects, the camera intrinsic matrix describes various geometric properties of the camera, such as focal length (the distance between the pinhole and the film or image sensor), principal point offset (the location of the principal point of the camera relative to the film's origin or the image sensor location), and axis skew (causing shear distortion in the projected image).

Figure 5:
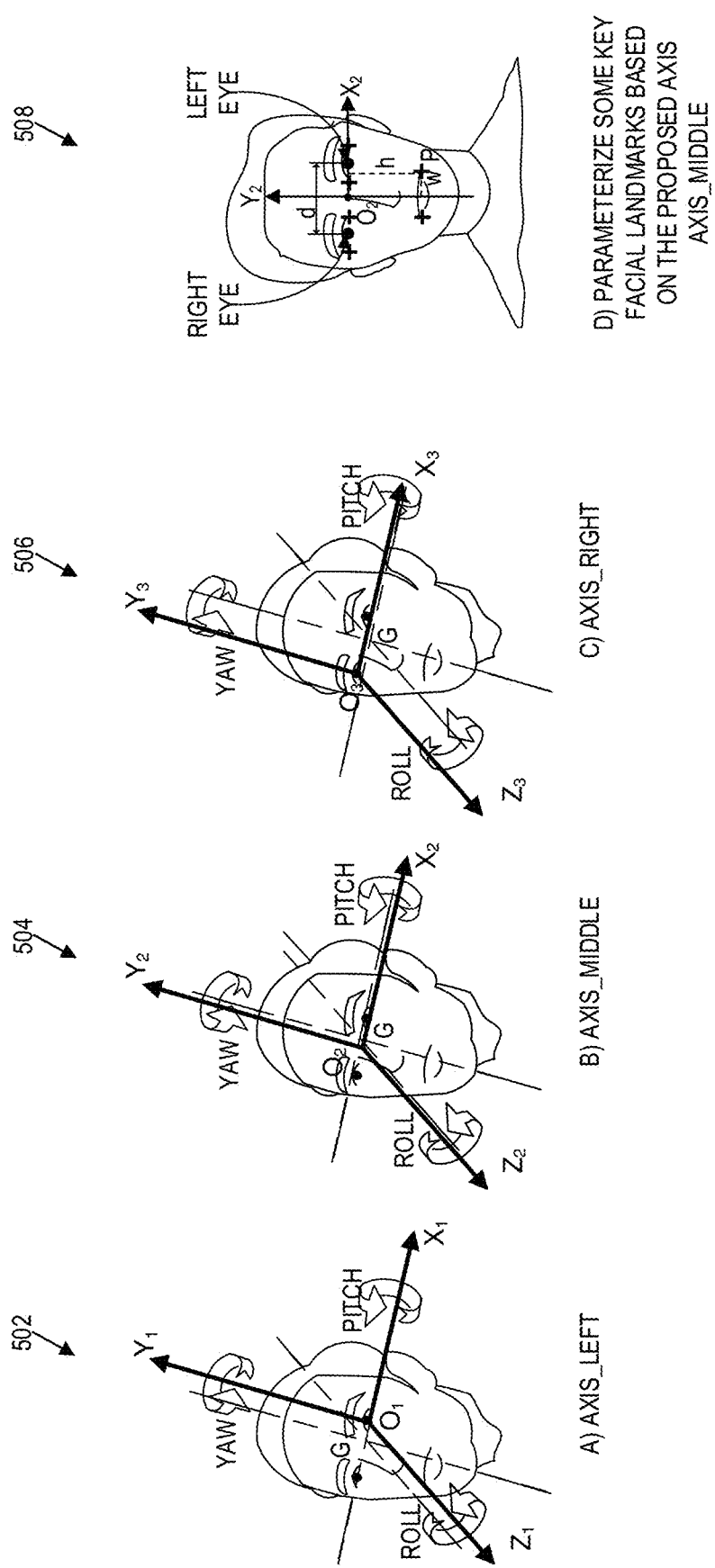
FIG. 5 illustrates different head pose axis systems and key facial landmark parameterization, according to some example embodiments.

FIG. 5 illustrates different head pose axis systems and key facial landmark parameterization, according to some example embodiments. In some aspects, the origin of a head pose axis is set to the center of a user's head (e.g., point G in FIG. 1), which is a virtual point within a user's head and is difficult to be measured or estimated. Referring to FIG. 5, three new head pose axis systems are illustrated (namely, axis_left, axis_middle, and axis_right), which can be used for head pose angle estimation. For example, at diagram 502, head pose axes X1-Y1-Z1 are centered at point O1, which is the center of corneal curvature of the left eye. At diagram 504, head pose axes X2-Y2-Z2 are centered at point O2, which is the midpoint between the centers of corneal curvatures of both eyes. At diagram 506, head pose axes X3-Y3-Z3 are centered at point O3, which is the center of corneal curvature of the right eye.

Referring back to FIG. 4A, at operation 414, the three new head pose axes (axis_left, axis_middle, and axis_right) can be determined based on the centers of corneal curvatures of the user's eyes. At operation 416, key facial landmarks can be parameterized, which can include determining the landmark coordinates in relation to one or more of the new head pose axes. In some aspects, the facial landmarks can include corners of the user's eyes, corners of the user's mouth, or other facial landmarks. For simplicity, it is assumed that these facial landmarks are on the same plane with the centers of corneal curvatures. Since the detection of these facial landmarks is stable when the subject's head is moving/rotating, estimation of head pose angles based on such facial landmarks can be more accurate than conventional techniques for head pose angle estimation using common head pose axes.

At operation 416, the key facial landmarks are parameterized with respect to the three new head pose axes to obtain three corresponding facial landmark parameter sets: para_left, para_right, and para_middle. For simplicity, only the generation of the facial landmark parameter set para_middle is discussed herein below. However, similar determinations can be extended to the other facial landmark parameter sets since the only difference between the parameter sets is a coordinate axis translation. The online process 418 is illustrated in greater detail in FIG. 4B.

Referring again to FIG. 5, at diagram 508, the corners of the user's eyes and mouth are indicated as the facial landmarks. In some aspects, one of the following two manual techniques can be used in an offline calibration process (e.g., 410 in FIG. 4A) to generate a parameter set (e.g., parameter set para_middle) for those key facial landmarks.

In some aspects, a ruler can be used to manually measure the real distances between the proposed key facial landmarks and the origin O2 of the newly defined head pose axis axis_middle. To simplify the calculation, the midpoint of the two eyes can be used to approximate the midpoint of the centers of corneal curvatures of the left and right eyes, as these two points are close to each other. In the example given at diagram 508 in FIG. 5, the measured distance for the left mouth corner P is w (X2 direction) and h (Y2 direction), so the 3D coordinate of this corner point in the new head pose axis system axis_middle can be described as $Pm=[w, -h, 0]^T$, where the superscript T denotes the transpose operation of the vector/matrix.

In some aspects, facial landmark coordinates for the parameter set can be determined by aligning the proposed key facial landmarks to a standard 3D face model to obtain the 3D coordinates of these facial landmarks (in the coordinate system of the face model), and then adjusting the results based on the origin of the new head pose axis O2.

After determining the facial landmark parameter set para_middle, the remaining two parameter sets can be determined as well. As shown at diagram 508 in FIG. 5, if the measured distance between the two eyes is d, a translation matrix $Tl=[-d/2, 0, 0]^T$ can be applied to generate parameter set para_left from para_middle. For example, the 3D coordinate of the landmark P in para_left can be calculated as $Pl=Pm+Tl=[w-d/2, -h, 0]^T$. Similarly, the translation matrix to generate parameter set para_right can be written as $Tr=[d/2, 0, 0]^T$. By using this translation matrix, for example, the 3D coordinates of the facial landmark P in set para_right can be computed as $Pr=Pm+Tr=[w+d/2, -h, 0]^T$.

Referring to FIG. 4B, after determining the new head pose axes (at operation 414) and parameterizing key facial landmarks (at operation 416) during the offline process 410, an online process 418 for estimating the head pose angles can take place. In some aspects, the head pose axes can be determined during the offline process 410 based on the centers of corneal curvatures detected by the camera 404. For example and in reference to head pose axis axis_left, the axis can be determined by selecting the axis origin as the center of corneal curvature of the left eye of the user, as detected by the camera 404. As seen in FIG. 4B, the online process 418 for implementing the head pose angle calculation in image sequences includes a front head pose registration process 420 and real head pose angle estimation at 430-454.

In operation 422, a front pose image of the user can be acquired, and face/eye detection and corneal reflection detection can be performed using the image. For example, a front pose image of the user is acquired while the light sources 408 and 406 are active, to ensure that two corneal reflections are identified in both eyes of the user (e.g., as seen in FIG. 2B). Since the camera's image plane may not be exactly parallel to the user's face, there exists an original rotation between the camera axis and the front head pose axis. The front head pose registration process 420 is, therefore, also used to calculate the original rotation angles. At operation 424, the 3D coordinates of the centers of corneal curvatures of the left and right eyes of the user can be calculated, and the midpoint between the centers of corneal curvatures can be set as the origin of the head pose axis axis_middle for this image. At operation 426, the facial landmark parameter set para_middle (e.g., as determined during the offline process 410) can be retrieved. At operation 428, the original rotation angles $\alpha_0$, $\beta_0$, and $\gamma_0$ can be calculated and the front head pose can be registered with the original rotation angles. As used herein, angles $\alpha_i$, $\beta_i$, and $\gamma_i$ refer to rotation angles associated with roll, pitch, and yaw of the user's head. A more detailed description of the front head pose registration process 420 is described with reference to FIG. 6. Even though the retrieving of the facial landmark parameter set para_middle is illustrated as a separate step 426, following the calculation of the coordinates of the centers of corneal curvatures at step 424, the disclosure is not limited in this regard. More specifically, the retrieving of the facial landmark parameter set para_middle can be performed as part of steps 422, 424, or 428.

Figure 6:
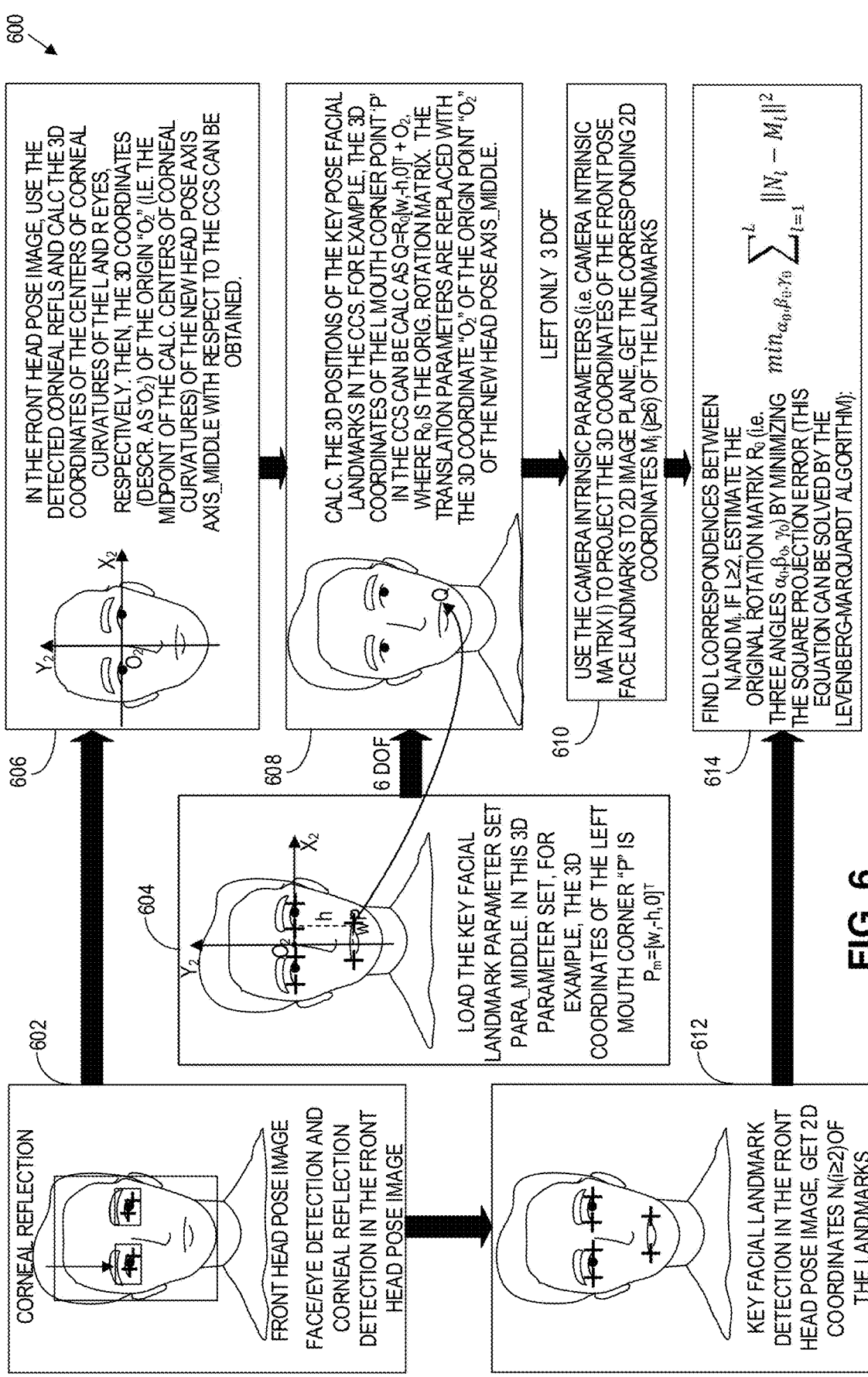
FIG. 6 is a flowchart illustration of front head pose registration which can be used in connection with the method illustrated in FIG. 4A and FIG. 4B, according to some example embodiments.

FIG. 6 is a flowchart illustration of an example operation 600 for front head pose registration which can be used in connection with the method illustrated in FIG. 4A and FIG. 4B, according to some example embodiments. Referring to FIG. 6, the example operation 600 for front head pose registration can start at operation 602, when a front head pose image of the user can be acquired by the camera 404. Face/eye detection and corneal reflection detection in the front head pose image can be performed. At operation 606, the detected corneal reflections can be used for calculating the 3D coordinates of the centers of corneal curvatures of the left and right eyes. The 3D coordinates of the origin O2 of the new head pose axis axis_middle with respect to the CCS are determined as the midpoint between the centers of corneal curvatures of the left and right eyes. At operation 604, the key facial landmark parameter set para_middle is acquired (e.g., as determined during the off-line process 410). For example, the 3D coordinates of the left mouth corner P are $Pm=[w, -h, 0]^T$.

At operation 608, the 3D positions of the key facial landmarks in the CCS can be determined. For example, the 3D coordinates of the left mouth corner point P in the CCS can be calculated as $Q=R0*[w, -h, 0]^T+O2$, where R0 is the original rotation matrix, and O2 is the 3D coordinates of the origin point of the new head pose axis axis_middle. In this regard, the coordinates of the right mouth corner point P in the CCS include a rotational component R0 (indicative of the original rotation angles) and a translational component provided by the coordinates of the origin point O2.

At operation 610, the camera intrinsic parameters (i.e., the camera intrinsic matrix I) can be used to project the 3D coordinates of the front pose facial landmarks into a two-dimensional (2D) image plane to obtain the corresponding 2D coordinates Mj of the landmarks. In some aspects, a sufficient number of 2D coordinates can be determined (e.g., j can be an integer greater than 5). At operation 612, key facial landmarks detected in the front head pose image can also be projected using the camera intrinsic parameters to obtain corresponding 2D coordinates Ni (where i can be an integer greater than 1). At operation 614, a number L of correspondences can be determined between Ni and Mj. In instances when L is greater than or equal to two, the original rotation matrix R0 can be estimated, e.g., by minimizing the square projection error $\min_{\alpha_0 \beta_0 \gamma_0} \Sigma_{l=1}^{L} \|N_l - M_l\|^2$ using the Levenberg-Marquardt algorithm (or another type of gradient descent algorithm). The original rotation angles $\alpha_0$, $\beta_0$, and $\gamma_0$ can be determined based on the estimated original rotation matrix R0.

In some aspects, to reduce noise during head pose angle estimation, in real applications, the front head pose operations illustrated in FIG. 6 can be independently repeated multiple times to obtain multiple estimations of the original rotation angles. Final front head pose angles can be registered as the averaged values of the independent estimations.

Referring again to FIG. 4B, once the original rotation angles are determined, the online process 418 can continue with operations 430-454 to estimate the true head pose angles in a current image. At operation 430, face/eye detection and corneal reflection detection can be performed in a current image of the user. At operation 432, the status of corneal reflection detection can be determined. More specifically and as seen in FIG. 3, one of three use cases 434, 436, and 438 can be selected based on the number of corneal reflections detected in the user's eyes. In some aspects, use case 434 may correspond to use case 302, use case 436 may correspond to use case 304, and use case 438 may correspond to use case 306.

In instances when two corneal reflections are detected only in the left eye area and no corneal reflections are detected in the right eye area (at use case 434), 3D coordinates of the center of corneal curvature of the left eye can be calculated at operation 440, and this point can be set as the origin of the new head pose axis axis_left for the current image. At operation 442, the facial landmark parameter set para_left (e.g., as determined during the off-line process 410) can be acquired.

In instances when two corneal reflections are detected in both eyes (at use case 436), 3D coordinates of the centers of corneal curvatures of the left and right eyes can be calculated at operation 444, and the midpoint between the two centers can be set as the origin of the new head pose axis axis_middle for the current image. At operation 446, the facial landmark parameter set para_middle (e.g., as determined during the off-line process 410) can be acquired.

In instances when two corneal reflections are detected only in the right eye area and no corneal reflections are detected in the left eye area (at use case 438), 3D coordinates of the center of corneal curvature of the right eye can be calculated at operation 448, and this point can be set as the origin of the new head pose axis axis_right for the current image. At operation 450, the facial landmark parameter set para_right (e.g., as determined during the off-line process 410) can be acquired.

Even though the retrieving of the facial landmark parameter sets paragraph_left, para_middle, and paragraph_right are illustrated as separate steps (e.g., 442, 446, and 450), following the corresponding calculations of 3D coordinates (e.g., 440, 444, and 448), the disclosure is not limited in this regard. More specifically, the retrieving of the facial landmark parameter sets paragraph_left, para_middle, and paragraph_right can be performed as part of corresponding steps 440, 444, 448, or 452. In this regard, operations 426, 442, 446, and 450 are illustrated with dashed lines in FIG. 4B.

At operation 452, the original rotation angles $\alpha_1$, $\beta_1$, and $\gamma_1$ associated with the current pose image can be calculated. At operation 454, the true head pose angles in the current image can be calculated based on the original rotation angles $\alpha_0$, $\beta_0$, and $\gamma_0$ and $\beta_1$, $\gamma_1$, and $\gamma_1$. A more detailed flow diagram of the operations performed to estimate the true head pose angles in a current image is illustrated in FIG. 7.

Figure 7:
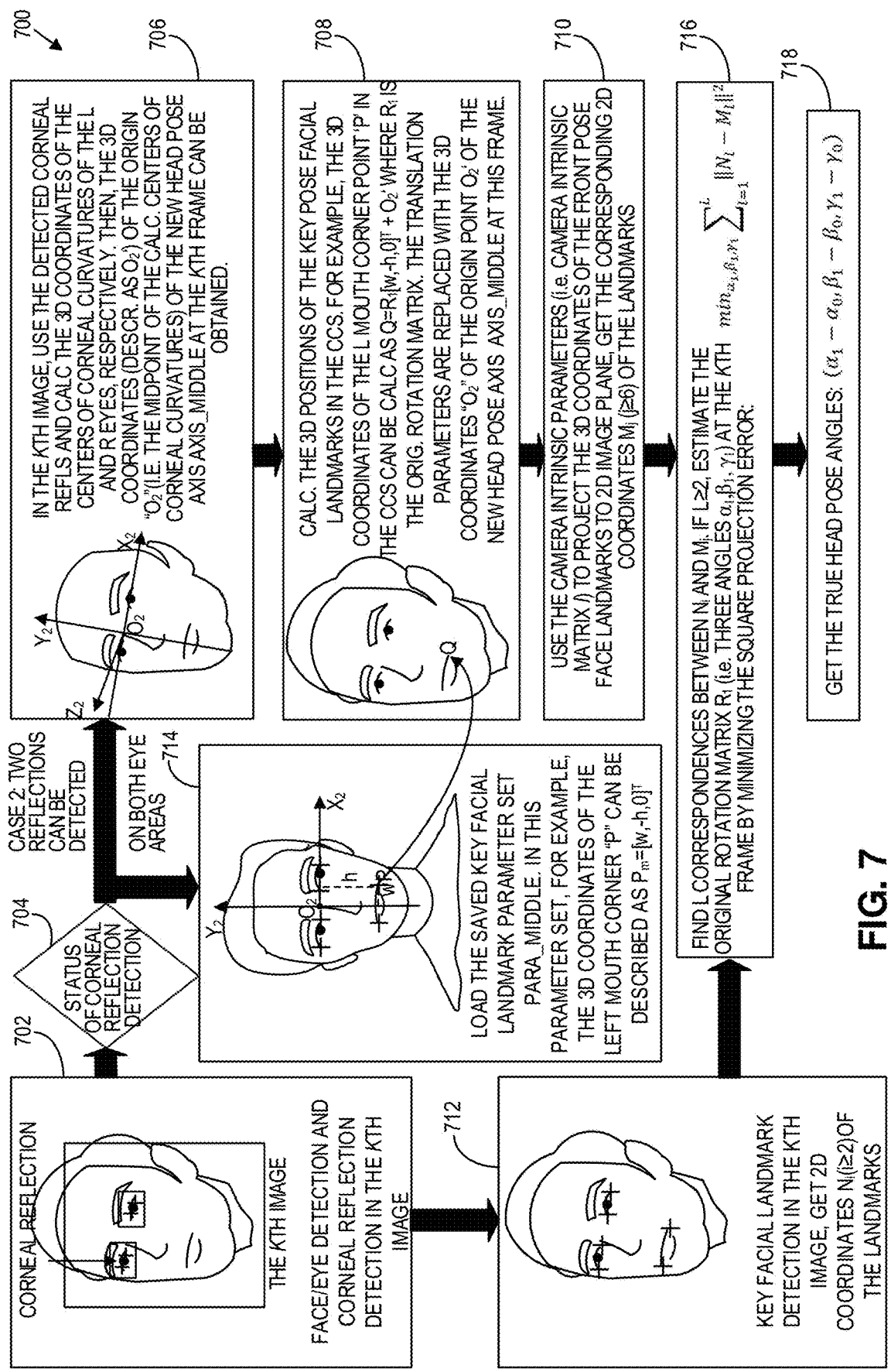
FIG. 7 is a flowchart illustration of true head pose angle estimation which can be used in connection with the method illustrated in FIG. 4A and FIG. 4B, according to some example embodiments.

FIG. 7 is a flowchart illustration of an example operation 700 for true head pose angle estimation which can be used in connection with the method illustrated in FIG. 4A and FIG. 4B, according to some example embodiments. Referring to FIG. 7, the example operation 700 for true head pose angle estimation can start at operation 702, when a current image of the user (e.g., a Kth image in a sequence of images) can be acquired by the camera 404. Face/eye detection and corneal reflection detection in the Kth image can be performed. At operation 704, the status of corneal reflection detection can be determined. For simplicity, only operations performed in the second use case (e.g., use case 436) are described herein below.

At operation 706, the detected corneal reflections in the Kth image can be used for calculating the 3D coordinates of the centers of corneal curvatures of the left and right eyes. The 3D coordinates of the origin O2' of the new head pose axis axis_middle with respect to the CCS are determined as the midpoint between the centers of corneal curvatures of the left and right eyes. At operation 714, the key facial landmark parameter set para_middle is acquired (e.g., as determined during the off-line process 410). For example, the 3D coordinates of the left mouth corner P are Pm=[w, −h, 0]$^T$.

At operation 708, the 3D positions of the key facial landmarks in the CCS can be determined. For example, the 3D coordinates of the left mouth corner point Pin the CCS can be calculated as Q=R1*[w, −h, 0]$^T$+O2', where R1 is the original rotation matrix and O2' is the 3D coordinates of the origin point of the new head pose axis axis_middle. In this regard, the coordinates of the right mouth corner point P (from the Kth image) in the CCS include a rotational component R1 (indicative of the original rotation angles) and a translational component provided by the coordinates of the origin point O2'.

At operation 710, the camera intrinsic parameters (i.e., the camera intrinsic matrix I) can be used to project the 3D coordinates of the facial landmarks of the Kth image into a two-dimensional (2D) image plane to obtain the corresponding 2D coordinates Mj of the landmarks. In some aspects, a sufficient number of 2D coordinates can be determined (e.g., j can be an integer greater than 5). At operation 712, key facial landmarks detected in the Kth image can also be projected using the camera intrinsic parameters to obtain corresponding 2D coordinates Ni (where i can be an integer greater than 1).

At operation 716, a number L of correspondences can be determined between Ni and Mj. In instances when L is greater than or equal to two, the original rotation matrix R1 can be estimated, e.g., by minimizing the square projection error $\min_{\alpha_1,\beta_1,\gamma_1}\Sigma_{i=1}^{i}\|N_i-M_i\|^2$, using the Levenberg-Marquardt algorithm (or another type of gradient descent algorithm). The original rotation angles $\alpha_1$, $\beta_1$, and $\gamma_1$ can be determined based on the estimated original rotation matrix R1. At operation 718, the true head pose angles (i.e., the rotation angles indicative of rotation taking place from the time the front head pose image is taken and the time the Kth image is taken) can be determined based on the original rotation angles $\alpha_0$, $\beta_0$, and $\gamma_0$ and $\alpha_1$, $\beta_1$, and $\gamma_1$ (e.g., the true head pose angles can be based on the corresponding differences of original rotation angles, $(\alpha_1-\alpha_0, \beta_1-\beta_0, \gamma_1-\gamma_0)$).

Even though FIG. 7 illustrates head pose angle estimation for corneal reflection detection associated with use case 436, similar operations can be performed when corneal reflection detection is associated with use cases 434 or 438. More specifically, the following changes can be made in head pose angle estimation operations associated with use cases 434 or 438: 1) the new head pose axis will be switched to axis_left (use case 434) or axis_right (use case 438); and 2) different key facial landmark parameter sets are used, namely, key facial landmark parameter set para_left (in use case 434) or para_right (in use case 438) for true head pose angle estimation. In calculations associated with use cases 434 or 438, the translation parameters of the moving/rotating head can be replaced with the 3D coordinates of the origins of the new head pose axes axis_left or axis_right. In this regard, there is no need to estimate translational and rotational components (i.e., estimating the six DOF associated with conventional ways for determining head pose rotation), and only rotational components can be determined using the techniques disclosed herein.

Techniques disclosed herein for head pose angle estimation are based on determining rotation in relation to a head pose axis (e.g., based on centers of corneal curvatures) that is different from the common head pose axis (e.g., the head pose axis originating at point G as seen in FIG. 1). A theoretical proof that the rotations of the facial landmarks around the origin of the new head pose axis are the same as the rotations of the facial landmarks around the origin of the common head pose axis is presented herein below and in reference to FIG. 8. More specifically, in instances when facial landmarks are modeled in a new head pose axis which is directly translated from the common head pose axis (without rotation), the rotations of the facial landmarks around the origin of the new head pose axis are the same as the rotations of the facial landmarks around the origin of the common head pose axis.

Figure 8:
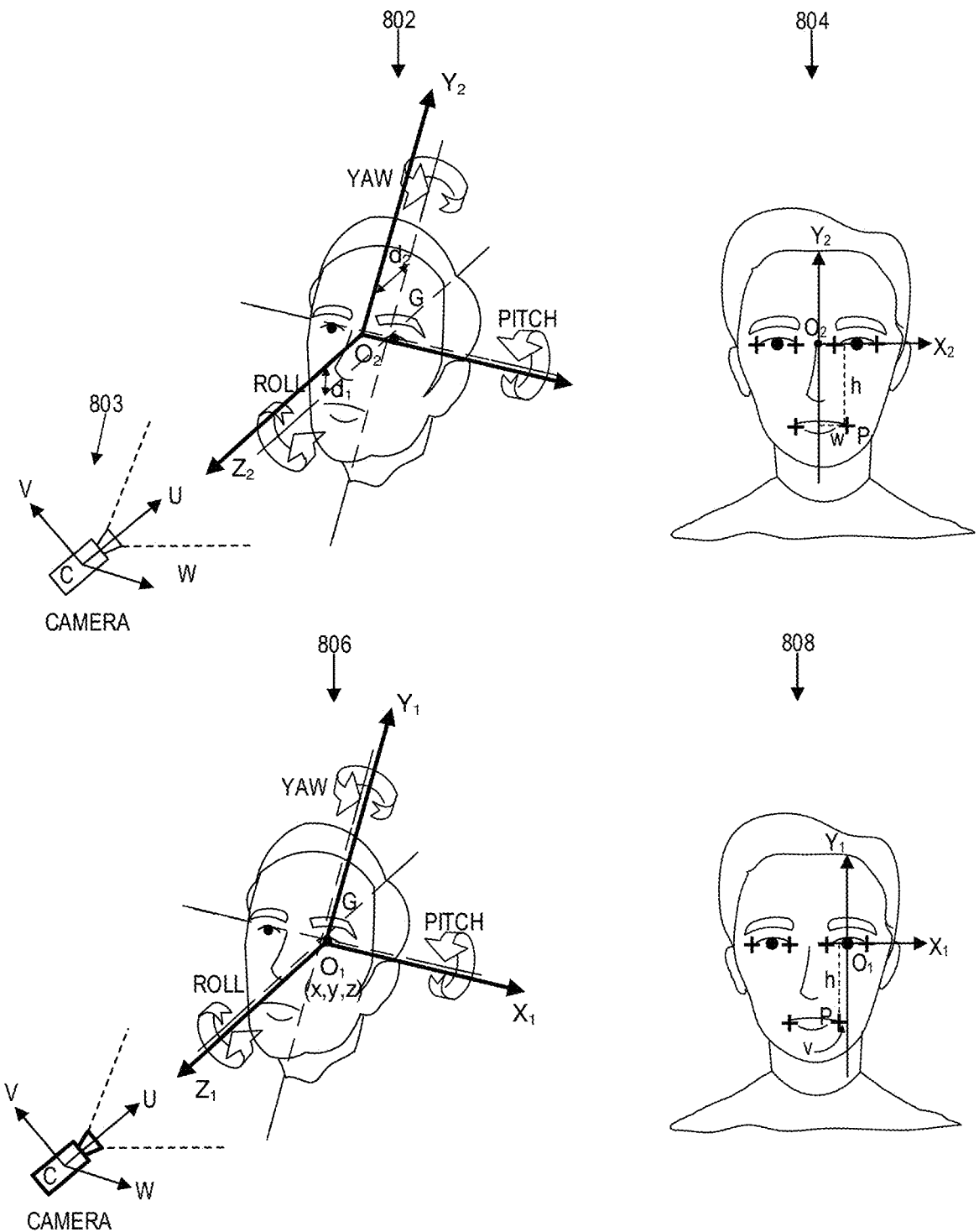
FIG. 8 illustrates different relationships of a common head pose axis and an axis used in connection with the head pose estimation system based on corneal reflections, according to some example embodiments.

FIG. 8 illustrates different relationships of a common head pose axis and a head pose axis used in connection with the head pose estimation system based on corneal reflections, according to some example embodiments. Referring to FIG. 8, diagram 802 illustrates a new head pose axis centered at point O2 (e.g., the midpoint between the corneal curvatures of both eyes) and a common head pose axis centered at point G (which is the virtual center of the user's head). Diagram 806 illustrates a new head pose axis centered at point O1 (e.g., the center of corneal curvature of the left eye) as well as the common head pose axis centered at point G. Diagrams 804 and 808 illustrate various facial landmarks in relation to points O2 and O1, respectively.

The coordinate of the origin G in the common head pose axis can be written as $[0, 0, 0]^T$. With respect to the camera coordinate system (CCS) 803, the translation matrix of this common head pose axis can be indicated as T.

As can be seen from diagram 802, the differences between the common head pose axis and the new head pose axis axis_middle are d1 in the $Y_2$ direction, d2 in the $Z_2$ direction, and 0 in the $X_2$ direction (because the point O2 is located at the midpoint of the right and left eyes). The coordinate of the origin O2 of the new head pose axis with respect to the common head pose axis can therefore be written as $[0, d1, d2]^T$.

After a rotation process with the matrix R around the origin G, the new position of the origin O2 in the common head pose axis can be written as $R*[0, d1, d2]^T$, and the corresponding 3D coordinate of this point O2 in the CCS is $O_2=R*[0, d1, d2]^T+T$, generating $T=O_2-R*[0, d1, d2]^T$, where O2 is the 3D coordinate of the midpoint of the centers of corneal curvatures of the left and right eyes in the CCS estimated by using the corneal reflections.

For a key facial landmark P (e.g., in diagram 804) in the new head pose axis with coordinate $Pm=[w, -h, 0]^T$, its coordinate in the common head pose axis is $[w, -h+d1, d2]^T$. After a rotation with matrix R around the origin point G, its coordinate in the camera axis can be written as: $Pm'=R*[w, -h+d1, d2]^T+T=R*[w, -h+d1, d2]^T+O_2-R*[0, d1, d2]^T=R*[w, -h, 0]^T+O_2$. This equation confirms that in this case, the new head pose axis axis_middle has the same performance as the common head pose axis to describe the motion of the subject's head.

The above finding can be extended to the other two proposed head pose axes axis_left and axis_right as follows:

In the common head pose axis in diagram 806, the 3D coordinate of the origin O1 of the new head pose axis axis_left is $[x, y, z]^T$. After a rotation process with the matrix R around the origin G, the new position of the origin O1 in the common head pose axis can be written as $R*[x, y, z]^T$, and the corresponding 3D coordinate of this point O1 in the CCS is $O_1=R*[x, y, z]^T+T$, resulting in $T=O_1-R*[x, y, z]^T$, where O1 is the 3D coordinate of the center of corneal curvature of the left eye in the CCS estimated by using the corneal reflections.

For a key facial landmark P in the new head pose axis (as seen in diagram 808) with coordinate $P_1=[-v, -h, 0]^T$, its coordinate in the common head pose axis is $[-v+x, -h+y, z]^T$. After a rotation with matrix R around the origin point G, its coordinate in the camera axis can be written as: $P_1'=R*[-v+x, -h+y, z]^T+T=R*[v+x, -h+y, z]^T+O_1-R*[x, y, z]^T=R*[-v, -h, 0]^T+O_1$.

From the above proof, it can be seen that as long as the key facial landmarks are modeled in a (proposed) new head pose axis which is translated from the common head pose axis (without rotation), the rotations of those landmarks around the origin of the new head pose axis are the same as the rotations of the facial landmarks around the origin of the common head pose axis.

Figure 9:
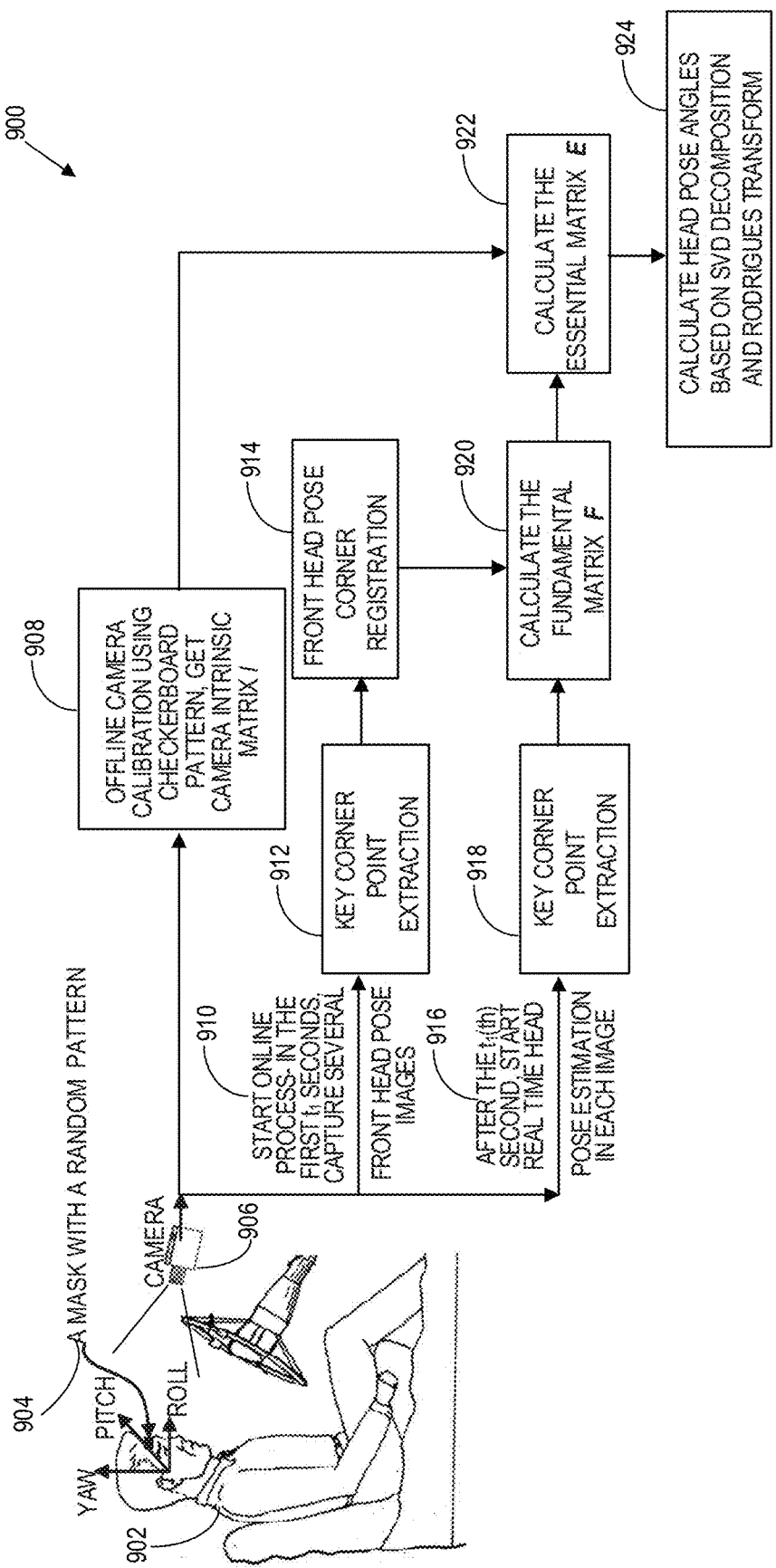
FIG. 9 is a flowchart illustration of a method of head pose estimation, according to some example embodiments.

FIG. 9 is a flowchart illustration of a method 900 of head pose estimation, according to some example embodiments. Referring to FIG. 9, the method 900 can be used for head pose angle estimation in connection with a camera monitoring system that includes a camera 906 viewing a user 902. In some aspects, the user 902 can be wearing a mask 904 with a random pattern, where the pattern can be appearing in a frontal pose of the user (e.g., the mask can be appearing on the user's forehead).

In operation 908, off-line camera calibration of the camera 906 can be performed using, e.g., a checkerboard pattern or another type of pattern, to obtain the camera intrinsic matrix I. In some aspects, the camera intrinsic matrix describes various geometric properties of the camera, such as focal length (the distance between the pinhole and the film or image sensor), principal point offset (the location of the principal point of the camera relative to the film's origin or the image sensor location), and axis skew (causing shear distortion in the projected image).

In operation 910, an online process can be initiated, capturing several front head pose images of the user in the first t1 seconds. In some aspects, t1 can equal five seconds or another duration. During operation 912, key corner points of the random pattern can be extracted, and front head pose corner registration can take place at operation 914. A more detailed view of operations 912 and 914 is described with reference to FIG. 10.

Figure 10:
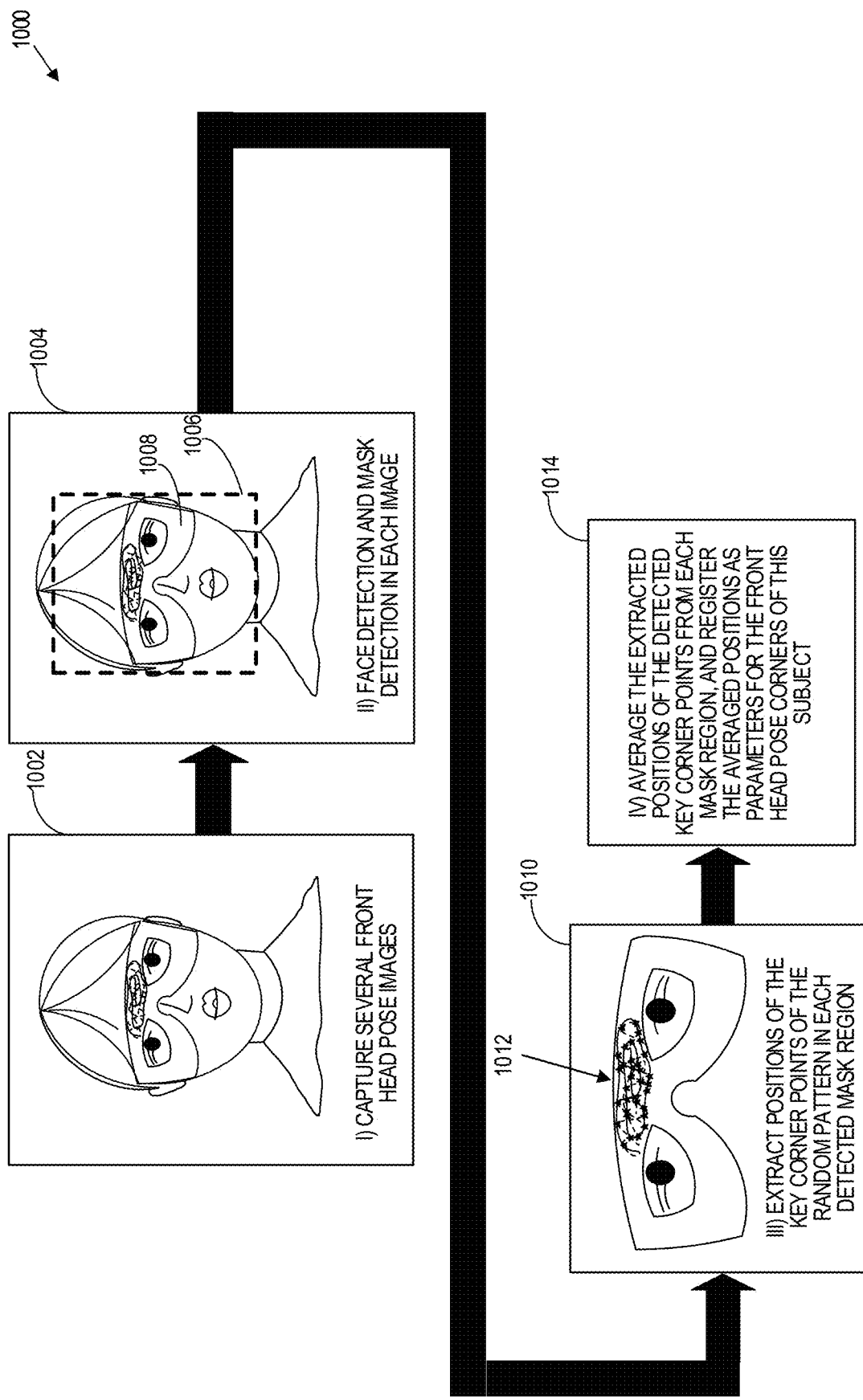
FIG. 10 illustrates front head pose registration for the method of FIG. 9, according to some example embodiments.

FIG. 10 illustrates front head pose registration for the method 900 of FIG. 9, according to some example embodiments. Referring to FIG. 10, an operation sequence 1000 can start at operation 1002, when several front head pose images can be captured. At operation 1004, face detection and mask detection can be performed in each front head pose image. More specifically, a face area 1006 and a mask 1008 (e.g., a physical mask worn by the user) can be detected in each front head pose image. At operation 1010, positions of key corner points of the random pattern on the mask can be extracted for each detected mask region associated with the front head pose images. For example, positions of different corner points within the detected mask 1012 can be extracted for each of the front head pose images. At operation 1014, the extracted positions of the detected key corner points from each mask region for the plurality of front head pose images can be averaged, and the averaged positions for each corner point can be registered as parameters for the front head pose corners associated with the mask worn by the user.

Referring back to FIG. 9, after the first t1 seconds have elapsed, real-time head pose estimation in each image can be initiated at operation 916. At operation 918, key corner points within the mask can be detected and coordinates of such key corner points can be extracted. For example, operation 918 can include operations 1004 and 1010 from FIG. 10. At operation 920, a fundamental matrix F can be calculated using the front head pose corner registration performed at operation 914 and the key corner point extraction performed at operation 918. During operation 920, correspondences between the extracted key corner points in a current image and corner points of a registered front head pose can be detected. If there exist more than a predetermined number of correspondences (e.g., more than or equal to eight correspondences), a fundamental matrix algorithm (e.g., an eight-point algorithm) can be used to compute the fundamental matrix F. In this regard, the fundamental matrix F relates the corresponding key corner points in the Kth image (taken after the t1 seconds have elapsed) and the original front head pose (taken during the initial t1 seconds).

An example 8-point algorithm for computing the fundamental matrix F is presented herein below:

Given n≥8 image point correspondences $\{x_i \leftrightarrow x'_i\}$, determine the fundamental matrix F such that $x'^T_i F x_i = 0$.

Example Algorithm:
(i) Normalization: Transform the image coordinates according to $\hat{x}_i = T x_i$ and $\hat{x}'_i = T' x'_i$, where T and T' are normalizing transformations consisting of a translation and scaling.

(ii) Find the fundamental matrix $\hat{F}'$ corresponding to the matches $\hat{x}_i \leftrightarrow \hat{x}'_i$ by: (a) Linear solution: Determine $\hat{F}'$ from the singular vector corresponding to the smallest singular value of $\hat{A}$, where $\hat{A}$ is composed from the matches $\hat{x}_i \leftrightarrow \hat{x}'_i$; and (b) Constraint enforcement: Replace $\hat{F}$ by $\hat{F}'$ such that det $\hat{F}'=0$ using the singular-value decomposition (SVD).

(iii) Denormalization: Set $F = T'^T \hat{F}' T$. Matrix F is the fundamental matrix corresponding to the original data $x_i \leftrightarrow x'_i$.

At operation 922, the essential matrix E can be calculated using the fundamental matrix determined at operation 920 and the camera intrinsic matrix determined at operation 908. The essential matrix E, which is the specialization of the fundamental matrix to the case of normalized image coordinates, can be calculated as $E = I^T F I$, where I is the camera intrinsic matrix. The rotation matrix R can then be derived from the essential matrix E. The key steps can be described as:

(1) Apply the matrix singular-value decomposition (SVD) method to find the singular-value decomposition $E = U D V^T$;

(2) The (R, T) pair can be computed as one of four possible solutions: $(U G V^T, \lambda V[0, 0, 1]^T)$, $(U G V^T, -\lambda V[0, 0, 1]^T)$, $(U G^T V^T, \lambda [0, 0, 1]^T)$, $(U G^T V^T, -\lambda V[0, 0, 1]^T)$, where T is the translation matrix, and the matrix $$G = \begin{bmatrix} 0 & 1 & 0 \\ -1 & 0 & 0 \\ 0 & 0 & 1 \end{bmatrix};$$

and (3) Based on the constraint that seen points are in front of the camera, a single pair of correspondences can be used to find the correct solution.

At operation 924, the head pose angles can be calculated using the essential matrix, based on SVD decomposition and a Rodrigues transform applied to the rotation matrix R.

Figure 11:
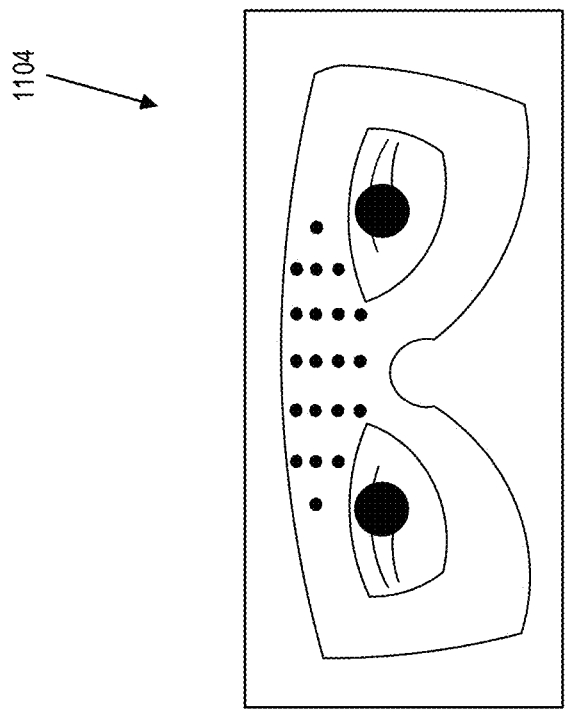
FIG. 11 illustrates example masks that can be worn by a user in connection with the method of FIG. 9, according to some example embodiments.
Figure 11:
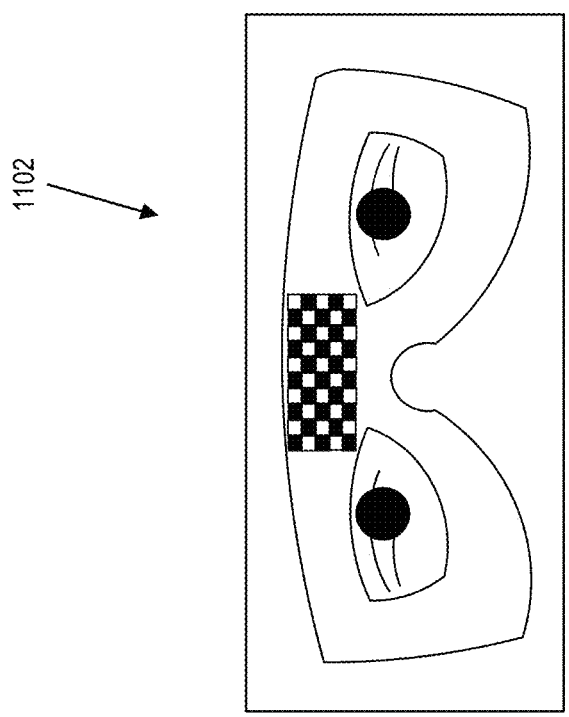
Figure 12:
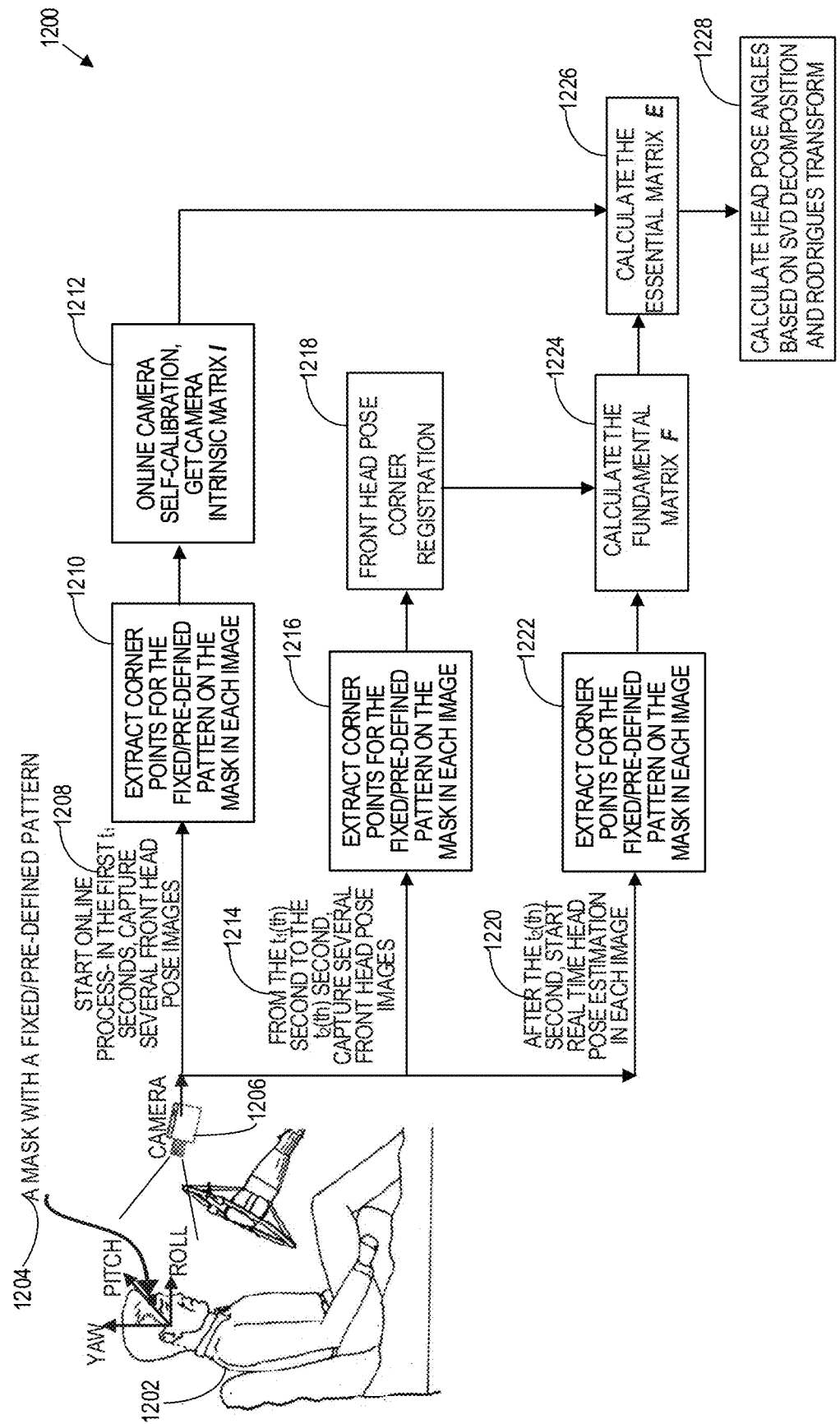
FIG. 12 is a flowchart illustration of a method of head pose estimation, according to some example embodiments.

FIG. 11 illustrates example masks that can be worn by a user in connection with the method 1200 of FIG. 12, according to some example embodiments. Referring to FIG. 11, there are illustrated two example masks 1102, 1104 with fixed predefined patterns which can be used in connection with the techniques described in FIG. 12. More specifically, the mask 1102 includes a predefined checkerboard pattern, and the mask 1104 includes a predefined dot pattern.

FIG. 12 is a flowchart illustration of a method 1200 of head pose estimation, according to some example embodiments. Referring to FIG. 12, the method 1200 can be used for head pose angle estimation in connection with a camera monitoring system that includes a camera 1206 viewing a user 1202. In some aspects, the user 1202 can be wearing a mask 1204 with a fixed/predefined pattern, where the pattern can be appearing in a frontal pose of the user (e.g., the mask can be appearing on the user's forehead).

The method 1200 differs from the method 900 in using an online process that will be executed first to automatically calibrate the camera system. By having the user wear a mask with a fixed or predefined pattern, the pattern measurements can be known in advance and can be stored for subsequent processing.

In operation 1208, the online process can be started and a plurality of front head pose images can be captured in the first t1 seconds. At operation 1210, corner points for the predefined or fixed pattern on the mask can be extracted in each image. In operation 1212, online camera calibration can be performed to obtain the camera intrinsic matrix I. In some aspects, the camera intrinsic matrix describes various geometric properties of the camera, such as focal length (the distance between the pinhole and the film or image sensor), principal point offset (the location of the principal point of the camera relative to the film's origin or the image sensor location), and axis skew (causing shear distortion in the projected image).

In operation 1214, additional front head pose images can be captured from the t1$^{th}$ second until the t2$^{th}$ second. During operation 1216, key corner points of the predefined/fixed pattern can be extracted, and front head pose corner registration can take place at operation 1218. A more detailed view of operations 1216 and 1218 is discussed with reference to FIG. 10 (in connection with a mask with a random pattern).

After the t2 seconds have elapsed, real-time head pose estimation in each image can be initiated at operation 1220. At operation 1222, key corner points within the predefined/fixed pattern of the mask can be detected and coordinates of such key corner points can be extracted. For example, operation 1222 can include operations 1004 and 1010 from FIG. 10 but performed in connection with the mask 1204 with a pre-defined pattern. At operation 1224, a fundamental matrix F can be calculated using the front head pose corner registration performed at operation 1218 and the key corner point extraction performed at operation 1222. During operation 1224, correspondences between the extracted key corner points in a current image and corner points of a registered front head pose can be detected. If there exist more than a predetermined number of correspondences (e.g., more than or equal to eight correspondences), a fundamental matrix algorithm (e.g., an eight-point algorithm) can be used to compute the fundamental matrix F. In this regard, the fundamental matrix F relates the corresponding key corner points in the Kth image (taken after the t1 seconds have elapsed) and the original front head pose (taken during the initial t1 seconds).

At operation 1226, the essential matrix E can be calculated. At operation 1228, the head pose angles can be calculated based on SVD decomposition and a Rodrigues transform. Operations 1224, 1226, and 1228 can be similar to operations 920, 922, and 924, respectively, as discussed above.

In some aspects, a mask with a predefined/fixed pattern can also be used to simplify operation 416 in FIG. 4A. More specifically, instead of parameterizing key facial landmarks (e.g., eye corners and mouth corners), key corner points of the fixed/predefined pattern on the mask can be parameterized (e.g., with respect to the midpoint of the two eye regions on the mask). As mentioned above, those parameters can be defined before producing the mask or can be measured after the production and be stored prior to performing head pose angle estimation techniques described herein. In this case, operation 416 can be skipped.

Figure 13:
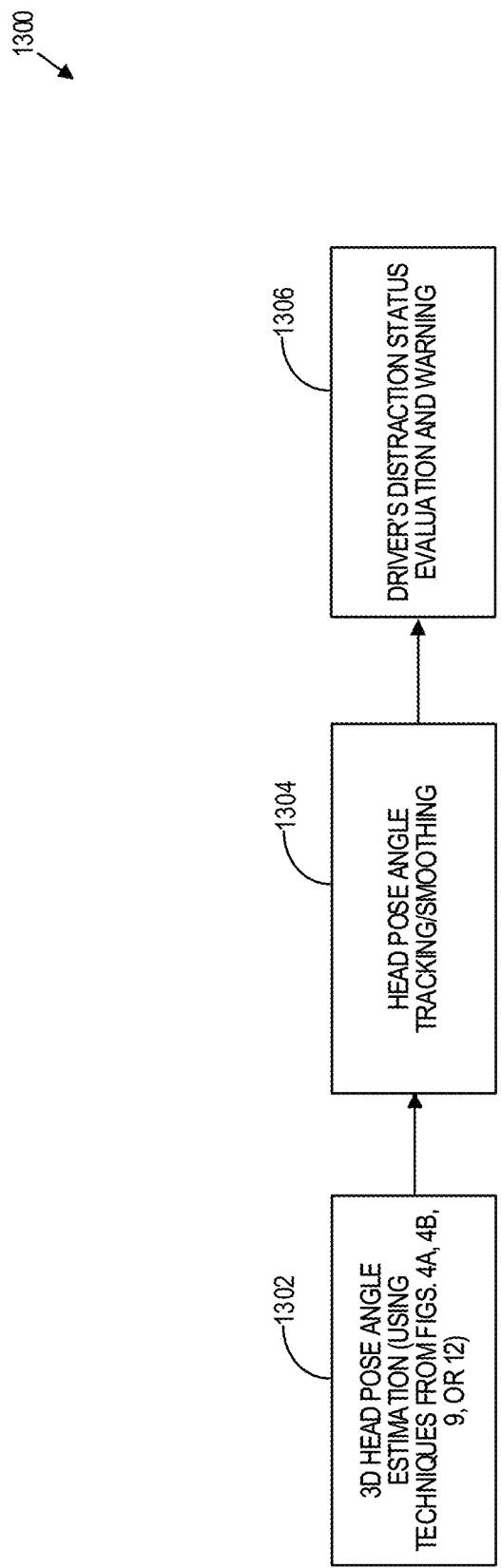
FIG. 13 is a flowchart illustration of a method of distraction evaluation using head pose angle estimation techniques disclosed herein, according to some example embodiments.

FIG. 13 is a flowchart illustration of a method 1300 of distraction evaluation using head pose angle estimation techniques disclosed herein, according to some example embodiments. Referring to FIG. 13, the method 1300 can start at operation 1302, where 3D head pose angle estimation can be performed. For example, head pose angle estimation can be performed based on techniques described herein, such as techniques described in FIG. 4A, FIG. 4B, FIG. 9, and/or FIG. 12.

At operation 1304, head pose angle tracking or smoothing can be performed. More specifically, to reduce the effective noise pollution, a temporal filtering module, such as a Kalman filter, can be used to track/smooth the 3D head pose angles estimated using one or more of the techniques disclosed herein. For instance, in connection with techniques described in FIG. 4A and FIG. 4B, predefined sets of facial landmark parameters can be adaptively switched as well as the coordinate system to fit quick rotation/movement of the user's head example and in reference to FIG. 4A, at operation 416, three parameter sets (e.g., 3D coordinates) can be determined for key facial landmarks in connection with the three head pose axes (axis_left, axis_right, and axis_center).

A temporal filtering module can be used to guarantee the smoothness and robustness of the switching between the models. In this regard, in instances of frequent head movement of the user, the coordinate system based on one of the three axes can be dynamically switched, and a corresponding set of facial landmark parameters can be used for head pose angle estimation.

At operation 1306, the user distraction status can be evaluated and a warning can be generated accordingly. For example, in a real driver's distraction monitoring application, if any angle in the detected head pose angle triplet is larger than a predefined threshold, a determination can be made that the user/driver is getting distracted, and an audio and/or vibration warning can be triggered to alert the driver.

Figure 14:
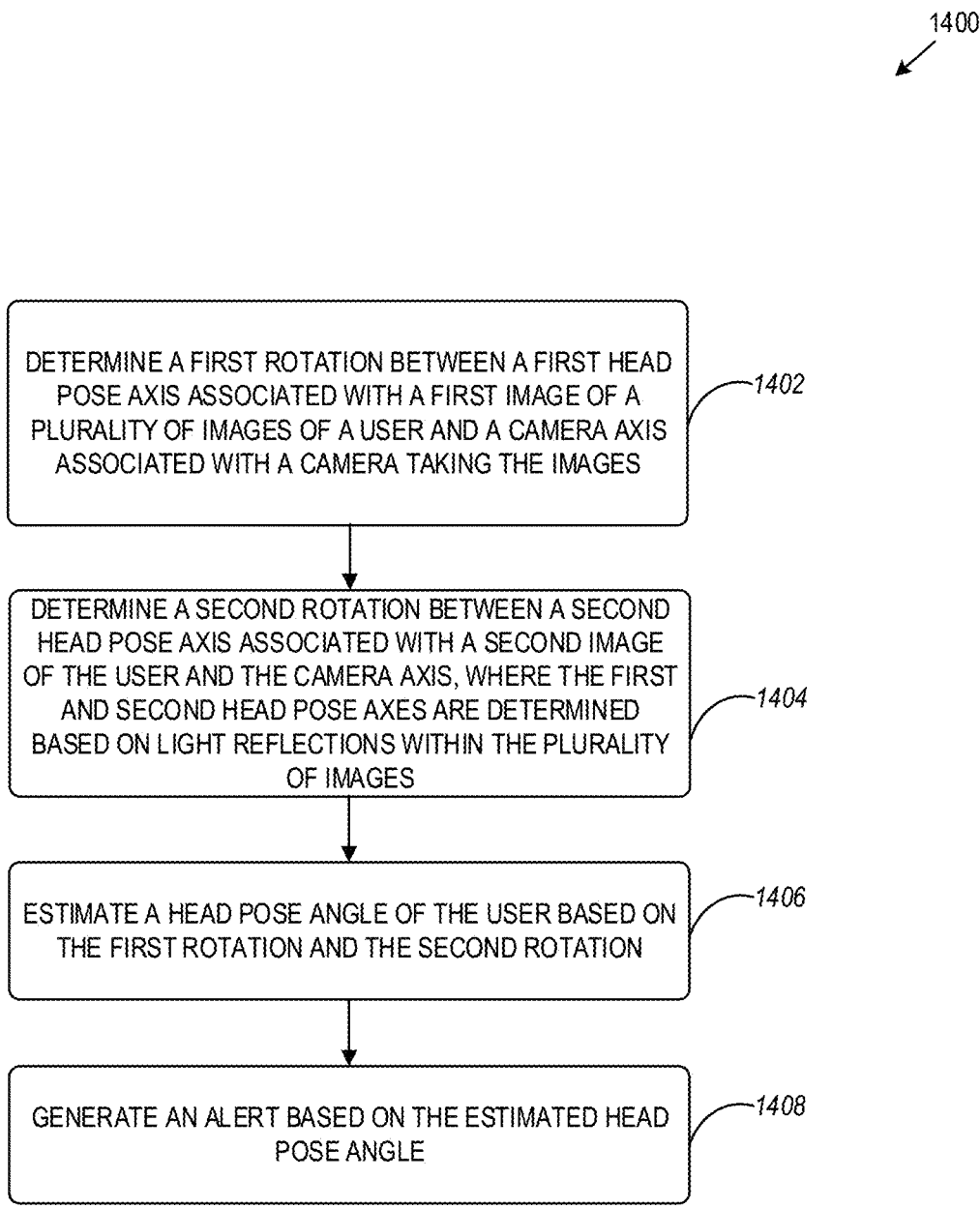
FIG. 14 is a flowchart illustration of a method of head pose estimation, according to some example embodiments.

FIG. 14 is a flowchart illustration of a method 1400 of head pose estimation, according to some example embodiments. Referring to FIG. 14, the example method 1400 can start with operation 1402, when a first rotation between a first head pose axis associated with a first image of a plurality of images of a user and a camera axis associated with a camera taking the images can be determined. For example, the first rotation can be associated with one or more of the original rotation angles calculated during the front head pose registration process 420 in FIG. 4B.

At operation 1404, a second rotation between a second head pose axis associated with a second image of the user and the camera axis can be determined. For example, the second rotation can be associated with one or more of the original rotation angles determined at operation 452 in FIG. 4B. The first and second head pose axes can be determined based on light reflections within the plurality of images. For example, the second head pose axis can be determined based on corneal reflections of one or more light sources that are used in connection with a camera (e.g., as described in connection with FIG. 2A, FIG. 2B, FIG. 3, and FIG. 5).

At operation 1406, a head pose angle of the user can be estimated based on the first rotation and the second rotation. For example, the true head pose angles can be estimated at operation 718, as discussed with reference to FIG. 7. At operation 1408, one or more alerts can be generated based on the estimated head pose angle.

Figure 15:
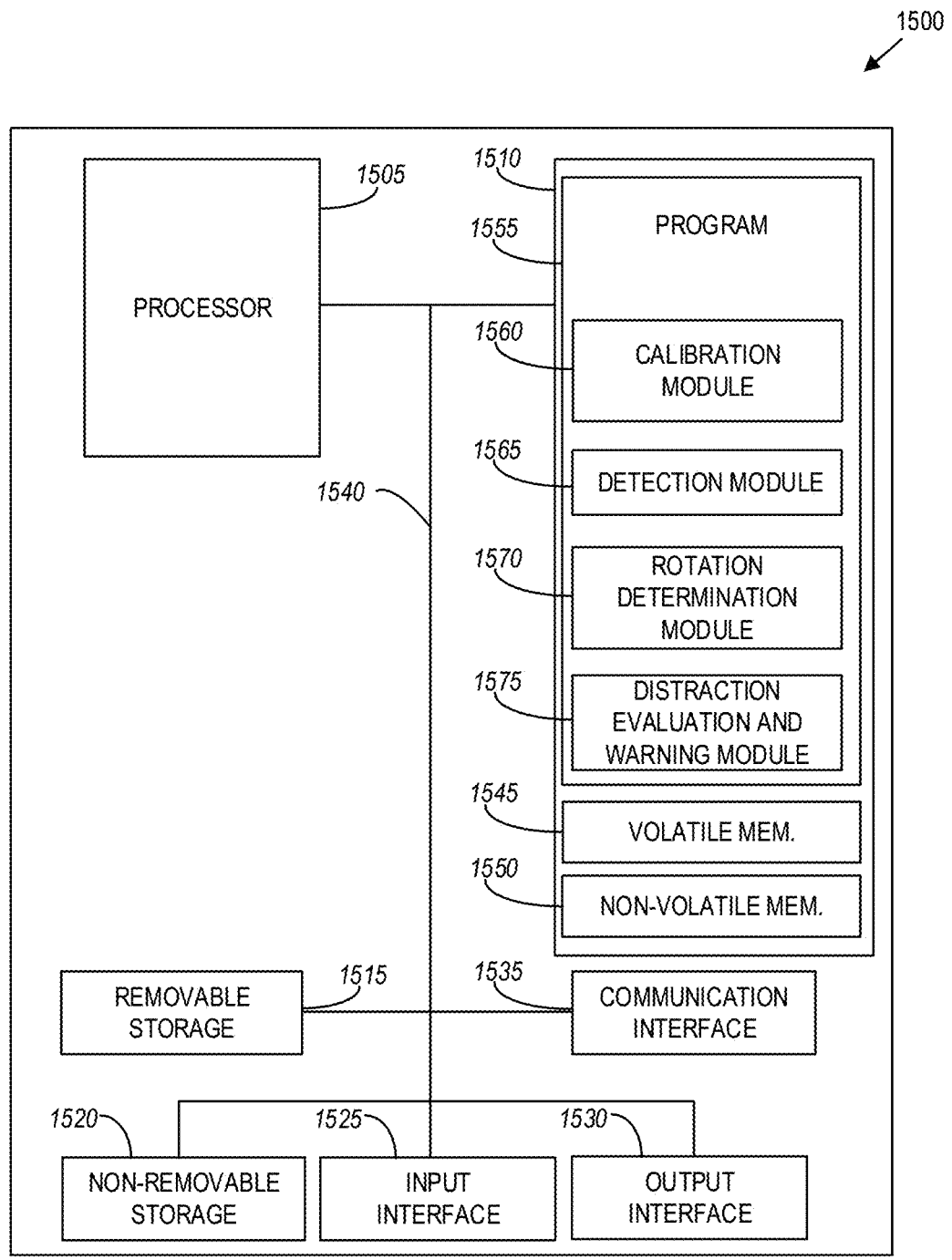
FIG. 15 is a block diagram illustrating circuitry for a device that implements algorithms and performs methods, according to some example embodiments.

FIG. 15 is a block diagram illustrating circuitry for a device that implements algorithms and performs methods, according to some example embodiments. All components need not be used in various embodiments. For example, clients, servers, autonomous systems, network devices, and cloud-based network resources may each use a different set of components, or, in the case of servers for example, larger storage devices.

One example computing device in the form of a network device 1500 (also referred to as a computer 1500, a computing device 1500, and a computer system 1500) may include a processor 1505, memory storage 1510, removable storage 1515, and non-removable storage 1520, all connected by a bus 1540. Although the example computing device is illustrated and described as the computer 1500, the computing device may be in different forms in different embodiments. For example, the computing device may instead be a smartphone, a tablet, a smartwatch, or another computing device including elements the same as or similar to those illustrated and described with regard to FIG. 15. Devices such as smartphones, tablets, and smartwatches are generally collectively referred to as "mobile devices" or "user equipment." Further, although the various data storage elements are illustrated as part of the computer 1500, the storage may also or alternatively include cloud-based storage accessible via a network, such as the Internet, or server-based storage.

The memory storage 1510 may include volatile memory 1545 and non-volatile memory 1550, and may store a program 1555. The computer 1500 may include, or have access to a computing environment that includes, a variety of computer-readable media, such as the volatile memory 1545, the non-volatile memory 1550, the removable storage 1515, and the non-removable storage 1520. Computer storage includes random-access memory (RAM), read-only memory (ROM), erasable programmable read-only memory (EPROM) and electrically erasable programmable read-only memory (EEPROM), flash memory or other memory technologies, compact disc read-only memory (CD ROM), digital versatile disks (DVD) or other optical disk storage, magnetic cassettes, magnetic tape, magnetic disk storage or other magnetic storage devices, or any other medium capable of storing computer-readable instructions.

The computer 1500 may include or have access to a computing environment that includes an input interface 1525, an output interface 1530, and a communication interface 1535. The output interface 1530 may interface to or include a display device, such as a touchscreen, that also may serve as an input device. The input interface 1525 may interface to or include one or more of a touchscreen, a touchpad, a mouse, a keyboard, a camera, one or more device-specific buttons, one or more sensors integrated within or coupled via wired or wireless data connections to the computer 1500, and other input devices. The computer 1500 may operate in a networked environment using the communication interface 1535 to connect (e.g., via a wired and/or wireless connection) to one or more remote computers, such as database servers. The remote computer may include a personal computer (PC), server, router, switch, network PC, peer device or other common network node, or the like. The communication interface 1535 may connect to a local-area network (LAN), a wide-area network (WAN), a cellular network, a WiFi network, a Bluetooth network, or other networks.

Though the computer 1500 is shown as having a single one of each element 1505-1575, multiples of each element may be present. For example, multiple processors 1505, multiple input interfaces 1525, multiple output interfaces 1530, and multiple communication interfaces 1535 may be present. In some example embodiments, different communication interfaces 1535 are connected to different networks.

Computer-readable instructions stored on a computer-readable medium (e.g., the program 1555 stored in the memory storage 1510) are executable by the processor 1505 of the computer 1500. A hard drive, CD-ROM, and RAM are some examples of articles including a non-transitory computer-readable medium such as a storage device. The terms "computer-readable medium" and "storage device" do not include carrier waves to the extent that carrier waves are deemed too transitory. "Computer-readable non-transitory media" includes all types of computer-readable media, including magnetic storage media, optical storage media, flash media, and solid-state storage media. It should be understood that software can be installed in and sold with a computer. Alternatively, the software can be obtained and loaded into the computer, including obtaining the software through a physical medium or distribution system, including, for example, from a server owned by the software creator or from a server not owned but used by the software creator. The software can be stored on a server for distribution over the Internet, for example.

The program 1555 is shown as including a calibration module 1560, a detection module 1565, a rotation determination module 1570, and a distraction evaluation and warning module 1575. Any one or more of the modules described herein may be implemented using hardware (e.g., a processor of a machine, an ASIC, an FPGA, or any suitable combination thereof). Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The calibration module 1560 may include suitable circuitry, interfaces, and/or code and can be configured to perform camera calibration functions, such as calibration functionalities performed during the calibration 412 and operations 908 and 1212. The detection module 1565 may include suitable circuitry, interfaces, and/or code and can be configured to perform corneal reflection detection in connection with the head pose angle estimation. For example, the detection module 1565 can be configured to perform the detection functionalities associated with operations 422, 430, 602, 612, 702, 712, 912, 918, 1210, 1216, and 1222. The rotation determination module 1570 may include suitable circuitry, interfaces, and/or code and can be configured to perform head pose angle estimation. For example, the rotation determination module 1570 can be configured to perform functionalities associated with operations 414, 416, 424-428, 432-454, 606-610, 614, 706-710, 714-718, 920-924, and 1224-1228. The distraction evaluation and warning module 1575 may include suitable circuitry, interfaces, and/or code and can be configured to generate one or more warnings or alarms based on the determined head pose angles.

Although a few embodiments have been described in detail above, other modifications are possible. For example, the logic flows depicted in the figures do not require the particular order shown, or sequential order, to achieve desirable results. Other steps may be provided in, or steps may be eliminated from, the described flows, and other components may be added to, or removed from, the described systems. Other embodiments may be within the scope of the following claims.

What is claimed is:

1. A computer-implemented method for estimating a head pose angle of a user, the method comprising:
   detecting, by one or more processors, corneal reflections based on at least one image of a plurality of images of the user's eyes;
   determining, by the one or more processors, three-dimensional (3D) coordinates of corneal curvatures of the user's eyes based on the corneal reflections;
   determining, by one or more processors, a rotation between a head pose axis associated with an image of the plurality of images and a camera axis associated with a camera taking the plurality of images;
   wherein, the head pose axis is determined based on the determined 3D coordinates; and
   estimating, by the one or more processors, a head pose angle of the user based on the rotation.

2. The method of claim 1, wherein the determining of the rotation further comprises:

determining, by one or more processors, a first rotation between a first head pose axis associated with a first image of the plurality of images of the user and the camera axis;

determining, by the one or more processors, a second rotation between a second head pose axis associated with a second image of the plurality of images and the camera axis; and wherein the estimating, by the one or more processors, of the head pose angle is based on the first rotation and the second rotation.

3. The method of claim 2, further comprising:

retrieving, by the one or more processors, facial landmark parameters of the user, the facial landmark parameters indicative of 3D coordinates of a plurality of facial landmarks of the user in relation to an initial head pose axis;

detecting, by the one or more processors, the plurality of facial landmarks within the first image and the second image based on the facial landmark parameters; and determining, by the one or more processors, the first rotation and the second rotation based on the detected plurality of facial landmarks.

4. The method of claim 3, further comprising:

determining, by the one or more processors, sources of the corneal reflections, wherein the sources comprise a left eye of the user or a right eye of the user.

5. The method of claim 4, wherein the 3D coordinates of the plurality of facial landmarks are in relation to:

a center of corneal curvature of the left eye;

a center of corneal curvature of the right eye; or a midpoint between the corneal curvatures of both eyes according to the sources determined.

6. The method of claim 3, wherein the plurality of facial landmarks comprise one or both of the user's eyes and the user's mouth.

7. The method of claim 2, wherein the first image is a front pose image of the user, and wherein the second image is an image that is acquired subsequently to the first image.

8. The method of claim 3, wherein determining the first rotation further comprises:

determining a first set of two-dimensional (2D) coordinates of the plurality of facial landmarks of the user based on the first image;

determining a second set of 2D coordinates of the plurality of facial landmarks of the user based on the 3D coordinates within the retrieved facial landmark parameters; and determining a plurality of rotation angles representing the first rotation based on facial landmark correspondences between the first set of 2D coordinates and the second set of 2D coordinates.

9. The method of claim 8, wherein determining the second set of 2D coordinates is further based on an intrinsic matrix of the camera.

10. The method of claim 2, wherein the first image comprises a first set of images taken by the camera, and wherein the method further comprises:

determining, by the one or more processors, the first rotation based on an average of rotation angles associated with the first set of images.

11. The method of claim 2, further comprising:

detecting, by the one or more processors, the user's face and a pattern superimposed on the user's face using at least the first image of the plurality of images;

determining, by the one or more processors, initial two-dimensional (2D) coordinates of a set of corner points within the pattern; and determining, by the one or more processors, subsequent 2D coordinates of the set of corner points using at least the second image of the plurality of images.

12. The method of claim 1, further comprising:

based on the estimated head pose angle, generating, by the one or more processors, an alert.

13. A system for estimating a head pose angle of a user, comprising:

a memory storage comprising instructions; and one or more processors in communication with the memory, wherein the one or more processors execute the instructions to perform operations comprising:

detecting corneal reflections based on at least one image of a plurality of images of the user's eyes;

determining three-dimensional (3D) coordinates of corneal curvatures of the user's eyes based on the corneal reflections;

determining a rotation between a head pose axis associated with an image of the plurality of images and a camera axis associated with a camera taking the plurality of images;

wherein the head pose axis is determined based on the determined 3D coordinates; and estimating a head pose angle of the user based on the rotation.

14. The system of claim 13, wherein to perform the determining, the one or more processors execute the instructions to perform operations comprising:

determining a first rotation between a first head pose axis associated with a first image of the plurality of images of the user and the camera axis;

determining a second rotation between a second head pose axis associated with a second image of the plurality of images and the camera axis; and wherein the estimating of the head pose angle is based on the first rotation and the second rotation.

15. The system of claim 14, wherein the one or more processors execute the instructions to further perform:

retrieving facial landmark parameters of the user, the facial landmark parameters indicative of 3D coordinates of a plurality of facial landmarks of the user in relation to an initial head pose axis;

detecting the plurality of facial landmarks within the first image and the second image based on the facial landmark parameters; and determining the first rotation and the second rotation based on the detected plurality of facial landmarks.

16. The system of claim 13, wherein the one or more processors execute the instructions to further perform:

generating an alert based on the estimated head pose angle.

17. A non-transitory computer-readable medium storing computer instructions for estimating a head pose angle of a user, that when executed by one or more processors, cause the one or more processors to perform steps of:

detecting corneal reflections based on at least one image of a plurality of images of the user's eyes;

determining three-dimensional (3D) coordinates of corneal curvatures of the user's eyes based on the corneal reflections;

determining a rotation between a head pose axis associated with an image of the plurality of images and a camera axis associated with a camera taking the plurality of images;

wherein the head pose axis is determined based on the determined 3D coordinates; and estimating a head pose angle of the user based on the rotation.

18. A computer-implemented method for estimating a head pose angle of a user, the method comprising:

capturing a plurality of images of the user using a camera;

determining, by one or more processors, a first rotation between a first head pose axis associated with a first image of the plurality of images of the user and a camera axis associated with the camera;

wherein the first head pose axis is determined based on light reflections within the plurality of images; and estimating, by the one or more processors, a head pose angle of the user based on the first rotation.

19. The method of claim 18, wherein the estimating of the head pose angle of the user further comprises:

estimating, by the one or more processors, the head pose angle of the user based on the first rotation and a second rotation; and wherein the second rotation is determined between a second head pose axis associated with a second image of the plurality of images and the camera axis, and the second head pose axis is determined based on light reflections within the plurality of images.

20. The method of claim 19, further comprising:

retrieving, by the one or more processors, facial landmark parameters of the user, the facial landmark parameters indicative of three-dimensional (3D) coordinates of a plurality of facial landmarks of the user in relation to an initial head pose axis.

21. The method of claim 20, further comprising:

detecting, by the one or more processors, the plurality of facial landmarks within the first image and the second image based on the facial landmark parameters; and determining, by the one or more processors, the first rotation and the second rotation based on the detected plurality of facial landmarks.

22. The method of claim 18, wherein the light reflections comprise corneal reflections based on at least one image of the plurality of images of the user's eyes, and wherein the method further comprises:

determining, by the one or more processors, the first head pose axis based on the corneal reflections.

* * * * *